US008855426B2

(12) United States Patent
Yamaoka et al.

(10) Patent No.: US 8,855,426 B2
(45) Date of Patent: Oct. 7, 2014

(54) INFORMATION PROCESSING APPARATUS AND METHOD AND PROGRAM

(75) Inventors: Keisuke Yamaoka, Tokyo (JP); Hideki Oyaizu, Tokyo (JP)

(73) Assignee: Sony Corporation, Tokyo (JP)

( * ) Notice: Subject to any disclaimer, the term of this patent is extended or adjusted under 35 U.S.C. 154(b) by 492 days.

(21) Appl. No.: 13/167,089

(22) Filed: Jun. 23, 2011

(65) Prior Publication Data
US 2012/0051651 A1 Mar. 1, 2012

(30) Foreign Application Priority Data

Aug. 31, 2010 (JP) ................................. 2010-194821

(51) Int. Cl.
G06K 9/40 (2006.01)
G06F 3/01 (2006.01)
H04N 21/44 (2011.01)
H04N 21/4223 (2011.01)
G06K 9/68 (2006.01)
G06K 9/00 (2006.01)
G06K 9/46 (2006.01)

(52) U.S. Cl.
CPC ............ *G06K 9/00362* (2013.01); *G06F 3/011* (2013.01); *H04N 21/44008* (2013.01); *H04N 21/4223* (2013.01); *G06K 9/685* (2013.01); *G06K 9/468* (2013.01)
USPC .......................................... 382/190; 382/275

(58) Field of Classification Search
USPC ......... 382/190, 167, 162, 275, 164, 141, 218, 382/209; 345/606, 156, 604; 358/518–521, 358/523, 537, 538, 452, 453, 463, 474; 348/46, 51, E13.074, E13.075
See application file for complete search history.

(56) References Cited

U.S. PATENT DOCUMENTS

| 6,407,762 | B2 * | 6/2002 | Leavy ........................... 715/862 |
| 7,391,903 | B2 * | 6/2008 | Ishiga ........................... 382/167 |
| 7,756,293 | B2 * | 7/2010 | Kuwabara et al. ............ 382/103 |
| 7,778,458 | B2 * | 8/2010 | Hiraoka ........................ 382/141 |
| 8,482,812 | B2 * | 7/2013 | Yashiro ......................... 358/464 |
| 2011/0261160 | A1 * | 10/2011 | Tadokoro et al. ............... 348/46 |

OTHER PUBLICATIONS

Kaname (CN*101324954 A) image processing apparatus, image display apparatus, imaging apparatus, method for image processing thereof, and program.*
Ankur Agarwal, et al. "A Local Basis Representation for Estimating Human Pose from Cluttered Images" To appear in Proceedings of the 7th Asian Conference on Computer Vision, 2006, 10 pages.

* cited by examiner

*Primary Examiner* — Sheela Chawan
(74) *Attorney, Agent, or Firm* — Oblon, Spivak, McClelland, Maier & Neustadt, L.L.P.

(57) ABSTRACT

An information processing apparatus includes: an inputting section adapted to input an image; a detection section adapted to detect a portion of an image pickup object from within the inputted image; a noticed region setting block adapted to set a noticed region from the detected portion; a restriction region setting block adapted to set a restriction region from the detected portion; and an extraction section adapted to extract feature values of the noticed region restricted by the restriction region.

7 Claims, 24 Drawing Sheets

CLOTHING FEATURE POINT

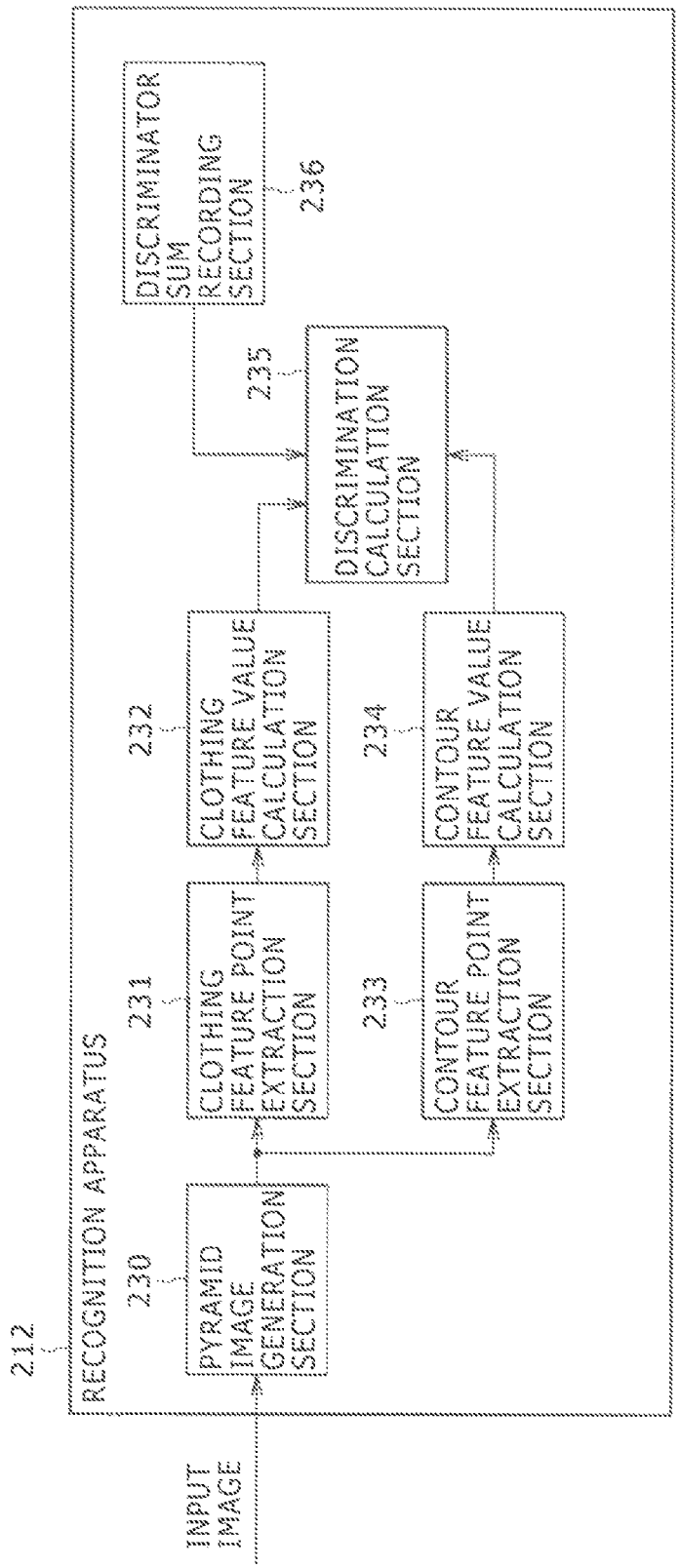

INFORMATION PROCESSING APPARATUS AND METHOD AND PROGRAM

BACKGROUND

This disclosure relates to an information processing apparatus and method and a program, and more particularly to an information processing apparatus and method and a program which involve extraction of a feature value.

In order to control operation of a television receiver, a remote controller is used. If a button of the remote controller is operated, then an infrared signal corresponding to the operated button is transmitted to the television receiver which is an object of control. The television receiver controls various operations based on a command corresponding to the received infrared signal.

However, although the remote controller is often placed on a table, a sofa or the like, the place at which it is placed is sometimes forgotten. In such an instance, the user must seek for the remote controller inconveniently.

Therefore, also it has been proposed to input a command by a gesture of the user. In order to detect a gesture, a predetermined algorithm is used to estimate a gesture of a person. An algorithm of the type described is disclosed, for example, in Ankur Agarwal and Bill Triggs, A Local Basis Representation for Estimating Human Pose from Cluttered Images, Proceedings of the 7th Asian Conference on Computer Vision, 2006.

SUMMARY

According to the algorithm described above, a multiple regression analysis called Ridge Regression is used to determine a nonlinear map between local feature values called Scale-invariant feature transform (SIFT) extracted in a noticed region and three-dimensional coordinates of joints of the human body to estimate a human body posture.

Further, in order to achieve improvement in accuracy in estimation, a process of suppressing feature values in the background part in the noticed region other than the human body is carried out. In particular, the background part is specified using the base of the feature values of the background determined using a technique called Non-negative matrix factorization (NMF), and the feature values in the background part are suppressed.

However, it is difficult to efficiently extract effective feature values.

Therefore, it is desirable to provide an information processing apparatus and method and a program by which an effective feature value can be extracted simply.

According to an embodiment of the present disclosure herein, there is provided an information processing apparatus including an inputting section adapted to input an image, a detection section adapted to detect a portion of an image pickup object from within the inputted image, a noticed region setting block adapted to set a noticed region from the detected portion, a restriction region setting block adapted to set a restriction region from the detected portion, and an extraction section adapted to extract feature values of the noticed region restricted by the restriction region.

In the information processing apparatus, the inputting section inputs an image, and the detection section detects a portion of an image pickup object from within the inputted image. Further, the noticed region setting block sets a noticed region from the detected portion, and the restriction region setting block sets a restriction region from the detected portion. Then, the extraction section extracts feature values of the noticed region restricted by the restriction region.

According to another embodiment, there is provided an information processing method including inputting an image, detecting a portion of an image pickup object from within the inputted image, setting a noticed region from the detected portion, setting a restriction region from the detected portion, and extracting feature values of the noticed region restricted by the restriction region.

According to a further embodiment, there is provided a program for causing a computer to function as such an information processing apparatus described as above.

With the information processing apparatus and method and the program, effective feature values can be extracted simply.

The above and other features and advantages of the present disclosure will become apparent from the following description and the appended claims, taken in conjunction with the accompanying drawings in which like parts or elements denoted by like reference characters.

BRIEF DESCRIPTION OF THE DRAWINGS

FIG. 24 is a block diagram showing a configuration of a recognition apparatus;

DETAILED DESCRIPTION OF THE PREFERRED EMBODIMENTS

In the following, embodiments of the present disclosure are described in the following order with reference to the accompanying drawings.
<First Embodiment>
[Configuration of the information processing apparatus]
[Controlling process]
[Learning process]
[Configuration of the feature value mathematical operation block]
[Configuration of the learning apparatus]
[Configuration of the clothing discriminator generation section]
[Configuration of the contour feature value calculation section]
[Learning process for discriminator sum generation]
[Clothing discriminator generation process]
[Contour feature value calculation process]
[Configuration of the recognition apparatus]
[Recognition process]
[Principle of the discriminator]
<Second Embodiment>
<Modification>
<Application to a Program>
<Others>

First Embodiment

[Configuration of the Information Processing Apparatus]

Figure 1:
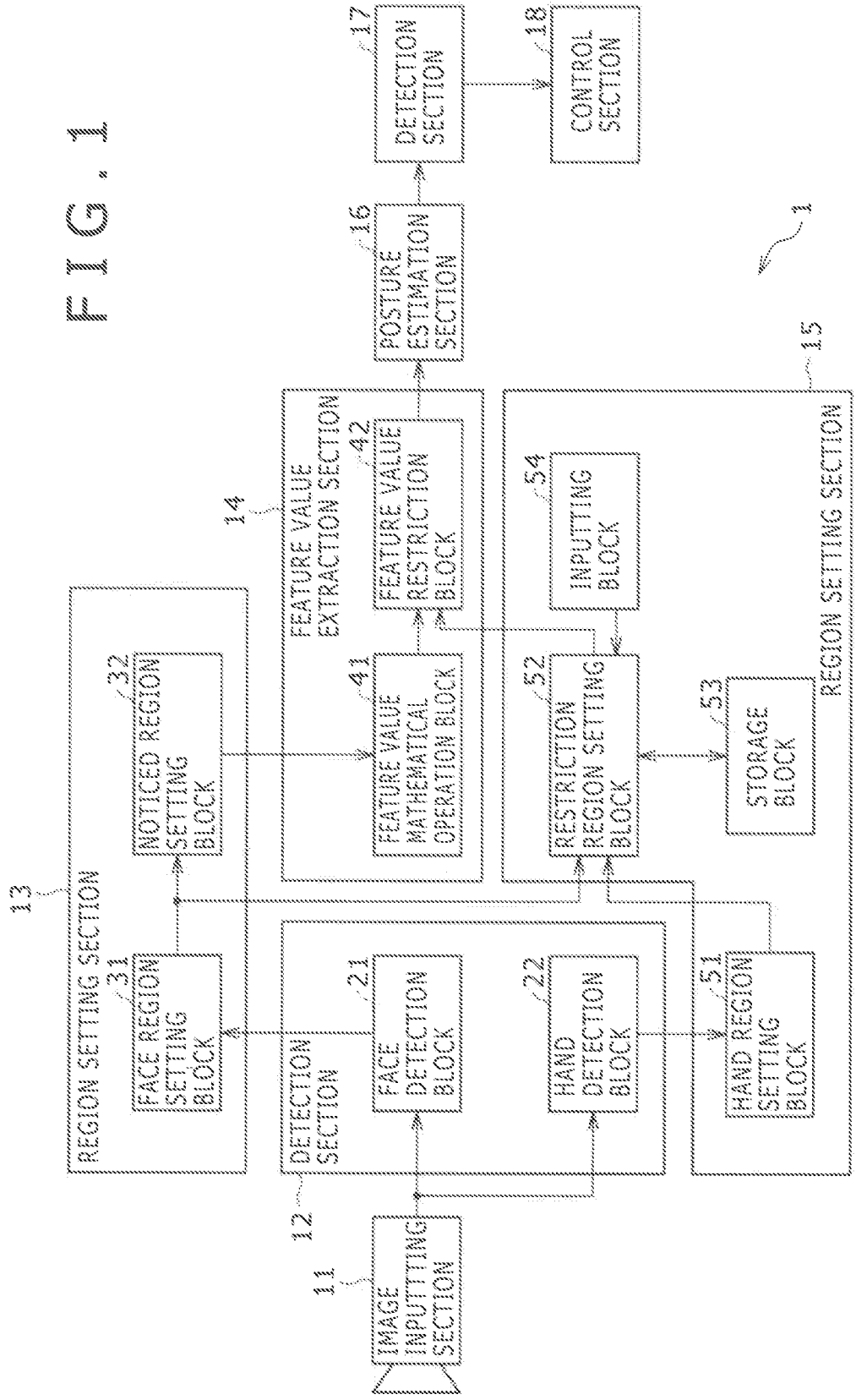
FIG. 1 is a block diagram showing a configuration of an information processing apparatus according to an embodiment of the present disclosure.

FIG. 1 shows a configuration of an information processing apparatus according to a first embodiment of the present disclosure. Referring to FIG. 1, the information processing apparatus 1 shown includes an image inputting section 11, a detection section 12, a region setting section 13, a feature value extraction section 14, a region setting section 15, a posture estimation section 16, a detection section 17, and a control section 18.

The information processing apparatus 1 is configured, for example, from a television receiver. The image inputting section 11 is, for example, a video camera and is mounted on a display not shown of the television receiver to pick up an image of a user.

The detection section 12 detects a portion of the user of an image pickup object. The detection section 12 includes a face detection block 21 and a hand detection block 22. The face detection block 21 detects the face as a portion of the user from the image supplied thereto from the image inputting section 11. The hand detection block 22 detects a hand as a portion of the user from the image supplied thereto from the image inputting section 11.

The region setting section 13 is used to set a noticed region and includes a face region setting block 31 and a noticed region setting block 32. The face region setting block 31 sets a face region in which the face is positioned with reference the face detected by the face detection block 21. The noticed region setting block 32 sets a noticed region from which a feature value is to be extracted with reference to the face region set by the face region setting block 31.

The feature value extraction section 14 is used to extract a valid feature value and includes a feature value mathematical operation block 41 and a feature value restriction block 42. The feature value mathematical operation block 41 mathematically operates a feature value in a noticed region set by the noticed region setting block 32. The feature value restriction block 42 restricts the feature value in a restriction region from the feature value mathematically operated by the feature value mathematical operation block 41 and extracts the feature value within the valid range in the noticed region.

The region setting section 15 includes a hand region setting block 51, a restriction region setting block 52, a storage block 53 and an inputting block 54. The hand region setting block 51 sets a hand region in which a hand is positioned with reference to the hand detected by the hand detection block 22. The restriction region setting block 52 sets a restriction region with reference to one or both of the face region set by the face region setting block 31 and the hand region set by the hand region setting block 51. The storage block 53 stores a relationship between one or both of the face region and the hand region and the restriction region. The restriction region setting block 52 sets a restriction region defined by one or both of the face region and the hand region based on the storage of the storage block 53. The inputting block 54 inputs data of a restriction region and so forth based on an instruction of the user.

The posture estimation section 16 estimates a posture of the user based on the feature value extracted by the feature value restriction block 42. The detection section 17 detects, based on the posture estimated by the posture estimation section 16, a corresponding command. The control section 18 executes a predetermined controlling process based on the command detected by the detection section 17.

[Controlling Process]

Figure 2:
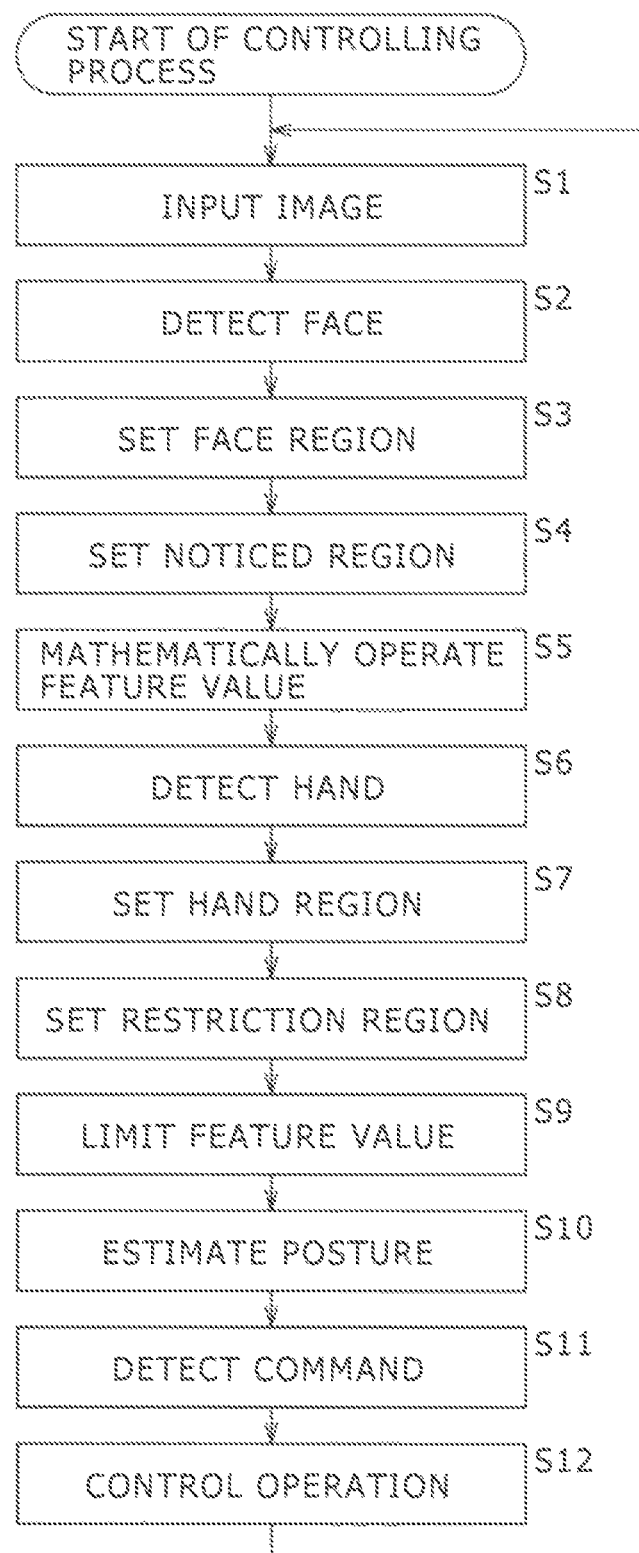
FIG. 2 is a flow chart illustrating a controlling process of the information processing apparatus.

FIG. 2 illustrates the controlling process. In the following, the controlling process of the information processing apparatus 1 is described with reference to FIG. 2. The process of FIG. 2 is repetitively executed while the power supply to the information processing apparatus 1 remains available.

At step S1, the image inputting section 11 inputs an image. In particular, an image of a user who watches the display of the information processing apparatus 1 is picked up and inputted. At step S2, the face detection block 21 detects the face of the user from the inputted image. At step S3, the face region setting block 31 sets a face region within a predetermined range with reference to the detected face. At step S4, the noticed region setting block 32 sets a noticed region within the predetermined range with reference to the face region set at step S3.

Figure 3:
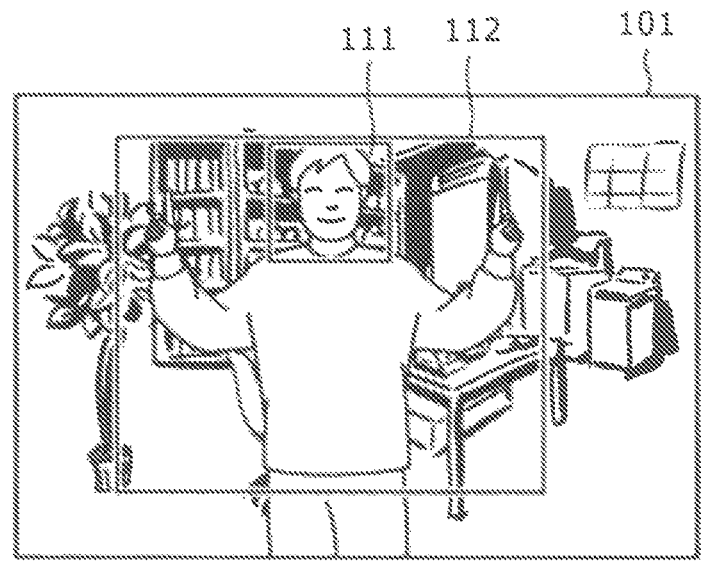
FIG. 3 is a schematic view showing an example of a noticed region.

FIG. 3 shows an example of the noticed region. Referring to FIG. 3, a predetermined region including the face detected from within an inputted image 101 is set as a face region. In the example of FIG. 3, a quadrangular region including the detected face is set as a face region 111.

Further, in the example of FIG. 3, a quadrangle including the face region 111 in the inside thereof is set as a noticed region 112. In particular, the upper side of the face region 111 is positioned at the center of the upper side of the noticed region 112. Where the length of the face region 111 in the horizontal direction is represented by Wh, the length from the right side edge of the face region 111 to the right side edge of the noticed region 112 is approximately 4/3 times the length Wh. Similarly, the length from the left side edge of the face region 111 to the left side edge of the noticed region 112 is approximately 4/3 times the length Wh. In other words, the length of the noticed region 112 in the horizontal direction is approximately four times the length of the face region 111 in the horizontal direction.

The length of the face region 111 in the vertical direction is equal to the length Wh in the vertical direction. The length of the noticed region 112 in the vertical direction is approximately three times the length Wh.

Referring back to FIG. 2, at step S5, the feature value mathematical operation block 41 mathematically operates a feature value of the noticed region 112. It is to be noted that the mathematical operation of the feature value is hereinafter described with reference to FIGS. 24 and 25.

It is to be noted that various known algorithms for detecting a person can be utilized for the mathematical operation of a feature value.

At step S6, the hand detection block 22 detects a hand from the inputted image 101. At step S7, the hand region setting block 51 sets a hand region within a predetermined range with reference to the detected hand.

Figure 4:
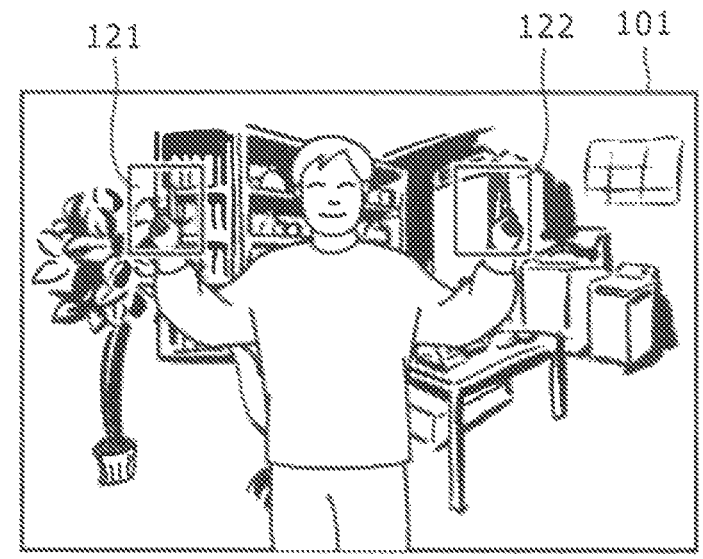
FIG. 4 is a schematic view showing an example of a hand region.

FIG. 4 shows an example of the hand region. A predetermined region including the detected hand from within the inputted image 101 is set as a hand region. In the example of FIG. 4, quadrangular regions including the detected right hand and left hand are set as hand regions 121 and 122, respectively.

It is to be noted that, for the detection of the face at step S2 and the detection of the hands at step S6, various known algorithms can be utilized. The face or the hands can be detected from such a feature as, for example, the color of the skin or a general shape of the face or a hand.

At step S8, the restriction region setting block 52 sets a restriction region to a predetermined region of the noticed region 112 other than the face region 111 and the hand regions 121 and 122. In other words, a region in which it is estimated that a portion of the human body does not exist is set as a restriction region. A relationship between the relative position and the size of the face region 111 and the hand regions 121 and 122 and the corresponding restriction region is learned and stored in the storage block 53 in advance. If this relationship is referred to, then when the face region 111 and the hand regions 121 and 122 of the predetermined relative position and size are given, a corresponding restriction region can be set.

It is to be noted that, for the setting of a restriction region, not both of the face region 111 and the hand regions 121 and 122 are used but only one of them, that is, only the face region 111 or the hand regions 121 and 122 may be used. However, the use of both of the face region 111 and the hand regions 121 and 122 makes comparatively accurate setting possible.

Figure 5:
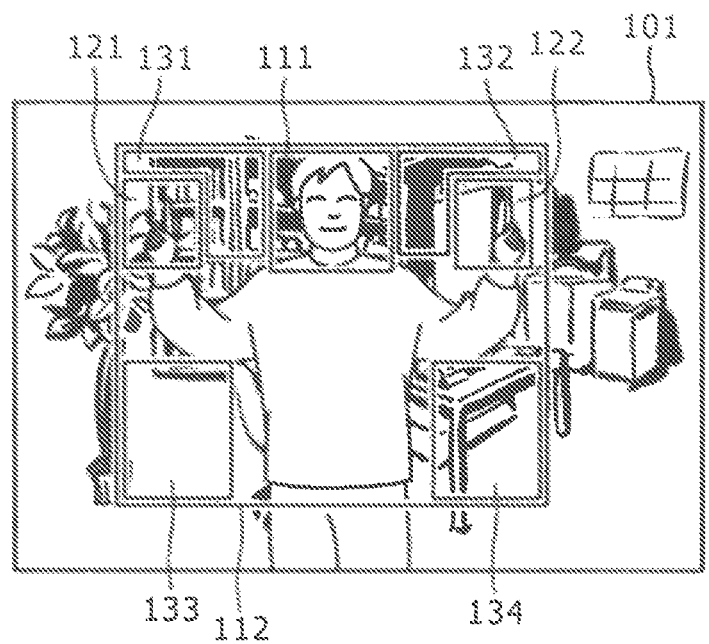
FIG. 5 is a schematic view showing an example of a restriction region.

FIG. 5 shows an example of a restriction region. In the example of FIG. 5, the hand region 121 of the right hand and the face region 111 are positioned at the substantially same height. Accordingly, it is estimated that, within a region between the hand region 121 and the face region 111, a portion of the human body does not exist. Further, since the hand is directed upwardly, it is estimated that a portion of the human body does not exist in a region above the hand region 121. Therefore, the region in and above the hand region 121 and the face region 111 is determined as a restriction region 131.

Also the relationship between the hand region 122 of the left hand and the face region 111 is similar to that between the hand region 121 of the right hand and the face region 111. Therefore, the region between and above the hand region 122 and the face region 111 is determined as another restriction region 132.

From the structure of the human body, the body is positioned in a region of a predetermined width on the lower side of the face region 111. Further, if the maximum length from a hand of the human body to the elbow is represented by L, then since the right hand is directed upwardly, it is estimated that a portion of the human body does not exist in a region spaced downwardly by more than a length L from the hand region 121. Accordingly, a further restriction region 133 is set in the region which satisfies the relationships described.

Similarly, since also the left hand is directed upwardly, it is estimated that a portion of the human body does not exist in a region spaced downwardly by more than the length L from the hand region 122 of the left hand. Accordingly, a still further restriction region 134 is set to the region which satisfies the relationships described.

Figure 6:
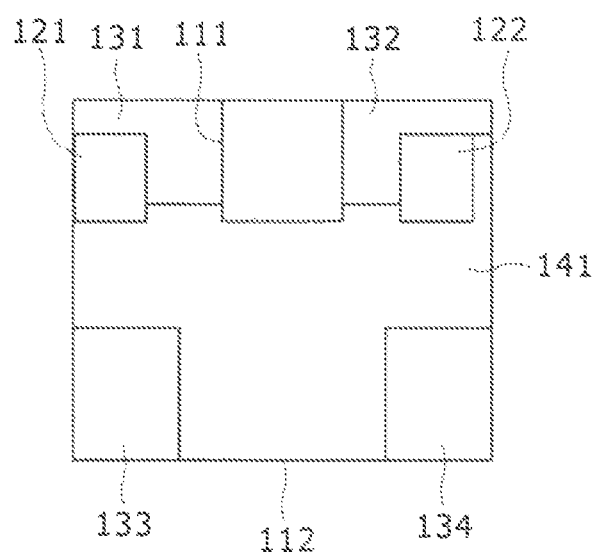
FIG. 6 is a schematic view showing a range from which a feature value is to be extracted.

FIG. 6 shows the ranges from which a feature value is to be extracted. A region 141 shown in FIG. 6 obtained by excluding the restriction regions 131 to 134 from the noticed region 112 in such a manner as described above and including the noticed region 111 and the hand regions 121 and 122 is estimated as a region in which the human body exists.

The relationship between the relative position and the size of the face region 111 and the hand regions 121 and 122 and the restriction regions can be learned using a function approximation technique such as a regression analysis or a neural network and determined as a nonlinear map. This learning is hereinafter described with reference to FIG. 7.

Referring back again to FIG. 2, at step S9, the feature value restriction block 42 restricts feature values in the restriction regions 131 to 134. In particular, from among the feature values mathematically operated at step S5, those which correspond to the restriction regions 131 to 134 are removed. In other words, only the feature values in the region 141 which is estimated to be a region in which the human body exists is extracted.

At step S10, the posture estimation section 16 estimates the posture. In particular, the posture of the user is estimated using the feature values restricted at step S9 and corresponding only to the region 141 which is estimated as a region in which the human body exists. The feature values of the background image from within the acquired image 101 are restricted and are not used for estimation of the posture. As a result, accurate and rapid estimation of the posture can be anticipated. A process of detecting the human body by the posture estimation section 16 is hereinafter described with reference to FIGS. 10 to 25.

At step S11, the detection section 17 detects a command. In particular, the user would use a portion of the human body to input a command. Gestures of body portions and commands are associated with each other in advance. The detection section 17 uses the command corresponding to the gesture of the user based on the corresponding relationship just described.

At step S12, the control section 18 controls operation. In particular, for example, the control section 18 changes over the channel of the television receiver, adjusts the sound volume or turns off the power supply.

[Learning Process]

Figure 7:
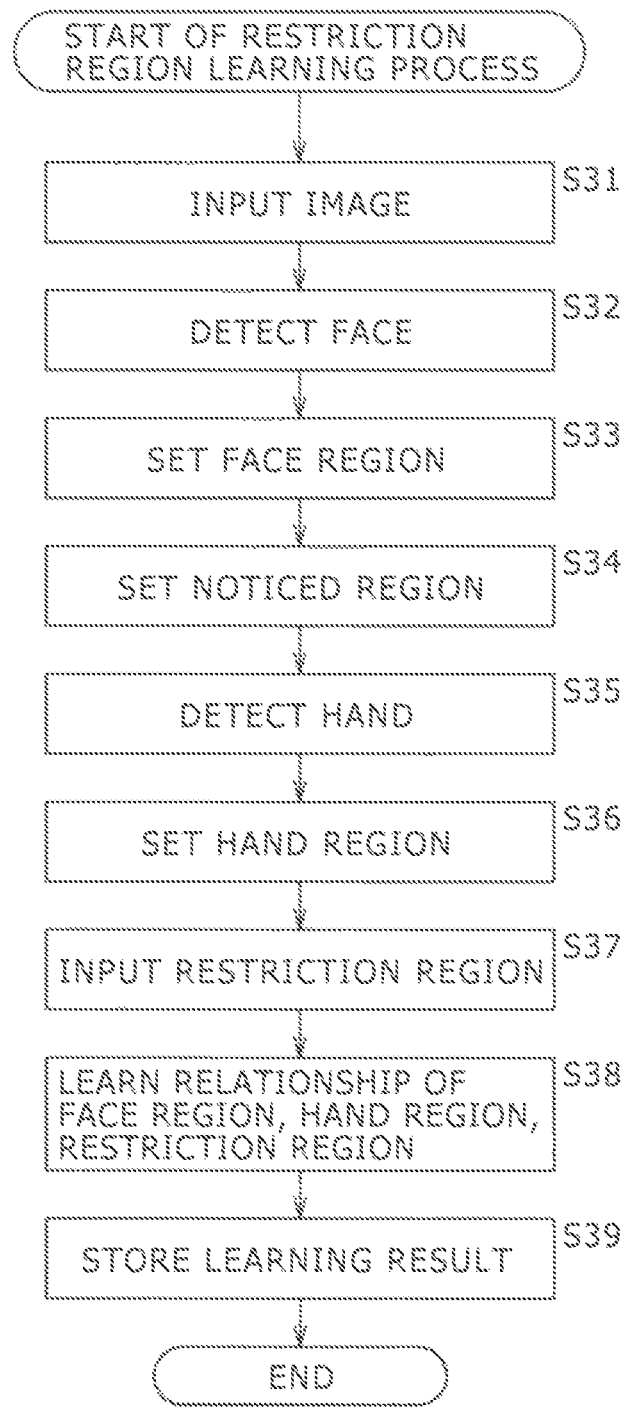
FIG. 7 is a flow chart illustrating a restriction region learning process of the information processing apparatus.

FIG. 7 illustrates a restriction region learning process. The learning process of a restriction region is described below with reference to FIG. 7.

At step S31, the image inputting section 11 inputs an image. In particular, an image of the user who watches the display of the information processing apparatus 1 is picked up and inputted. At step S32, the face detection block 21 detects the face from within the inputted image. At step S33, the face region setting block 31 sets a face region within a predetermined range with reference to the detected face.

Also in this instance, a quadrangular region including the detected face is set as a face region 111 similarly as at step S3 described hereinabove.

At step S34, the noticed region setting block 32 sets a noticed region to a predetermined region with reference to the face region 111 similarly as at step S4.

At step S35, the hand detection block 22 detects the hands from within the inputted image 101. At step S36, the hand region setting block 51 sets predetermined regions of the inputted image 101 including the detected hands as hand regions similarly as at step S7.

At step S37, the inputting block 54 inputs restriction regions to the restriction region setting block 52. In particular, correct restriction regions corresponding to the face region 111 and the hand regions 121 and 122 set at steps S33 and S36 are inputted to the restriction region setting block 52.

At step S38, the restriction region setting block 52 learns the relationship between the face region 111 and hand regions 121 and 122 and the restriction regions. This learning is carried out by changing the relative position and size of the face region 111 and the hand regions 121 and 122 in various manners. At step S39, the storage block 53 stores a result of the learning.

Figure 8:
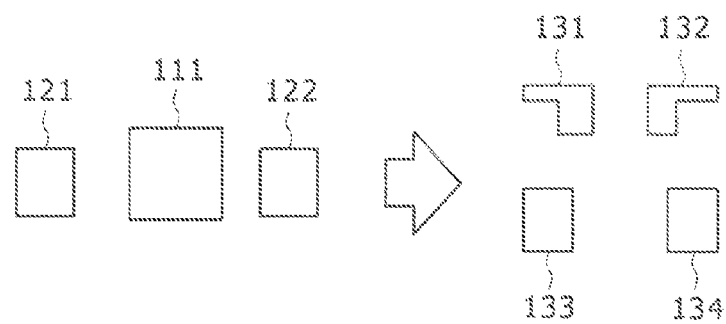
FIG. 8 is a schematic view illustrating an example of the restriction region learning process.

FIG. 8 illustrates the restriction region learning process. By carrying out the learning in such a manner as described above, the relationship between the face region 111 and hand regions 121 and 122 of a predetermined relative position and size and the corresponding restriction regions 131 to 134 as seen in FIG. 8 is learned and stored. As a result, if this relationship is referred to, then when a face region 111 and hand regions 121 and 122 of a predetermined relative position and size are given, corresponding restriction regions 131 to 134 can be set.

[Configuration of the Feature Value Mathematical Operation Block]

Figure 9:
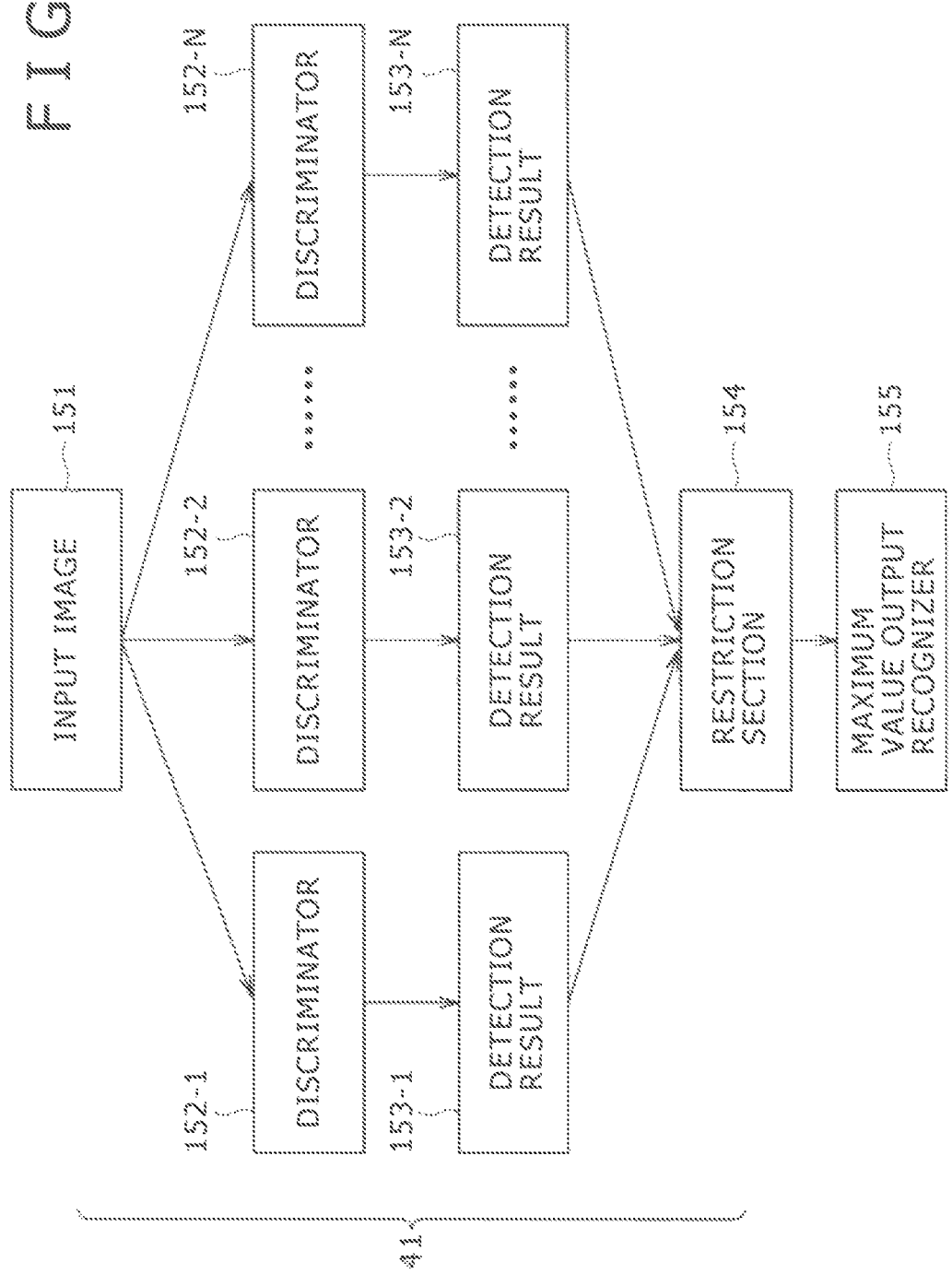
FIG. 9 is a block diagram showing a configuration of a feature value mathematical operation block shown in FIG. 1.

Now, the feature value mathematical operation block 41 is described further. FIG. 9 shows a general configuration of the feature value mathematical operation block 41.

Referring to FIG. 9, the feature value mathematical operation block 41 includes a plurality of recognizers 152-1 to 152-N (in the following description, where there is no necessity to individually distinguish them, each of them is referred to simply as recognizer 152; this similarly applies also to the other elements). The recognizers 152-1 to 152-N recognize individually different states of an object allocated thereto. Accordingly, the recognizers 152-1 to 152-N recognize N states as a whole. In other words, in the present embodiment, N different postures of a person are recognized.

Each of the recognizers 152-1 to 152-N recognizes a posture of a person included in an input image 151 inputted thereto from the noticed region setting block 32 and outputs a result of the recognition as a detection result 153-1 to 153-N. A restriction section 154 restricts those of the detection results 153-1 to 153-N which originate from the restriction regions. In other words, the restriction section 154 executes the function corresponding to the feature value restriction block 42 shown in FIG. 1.

A maximum value output recognizer 155 extracts a maximum detection result from among the detection results 153-1 to 153-N restricted by the restriction section 154. Consequently, the most likely posture is selected from among the postures recognized by the recognizers 152-1 to 152-N. In other words, the maximum value output recognizer 155 executes the function corresponding to the posture estimation section 16 shown in FIG. 1.

[Configuration of the Learning Apparatus]

Figure 10:
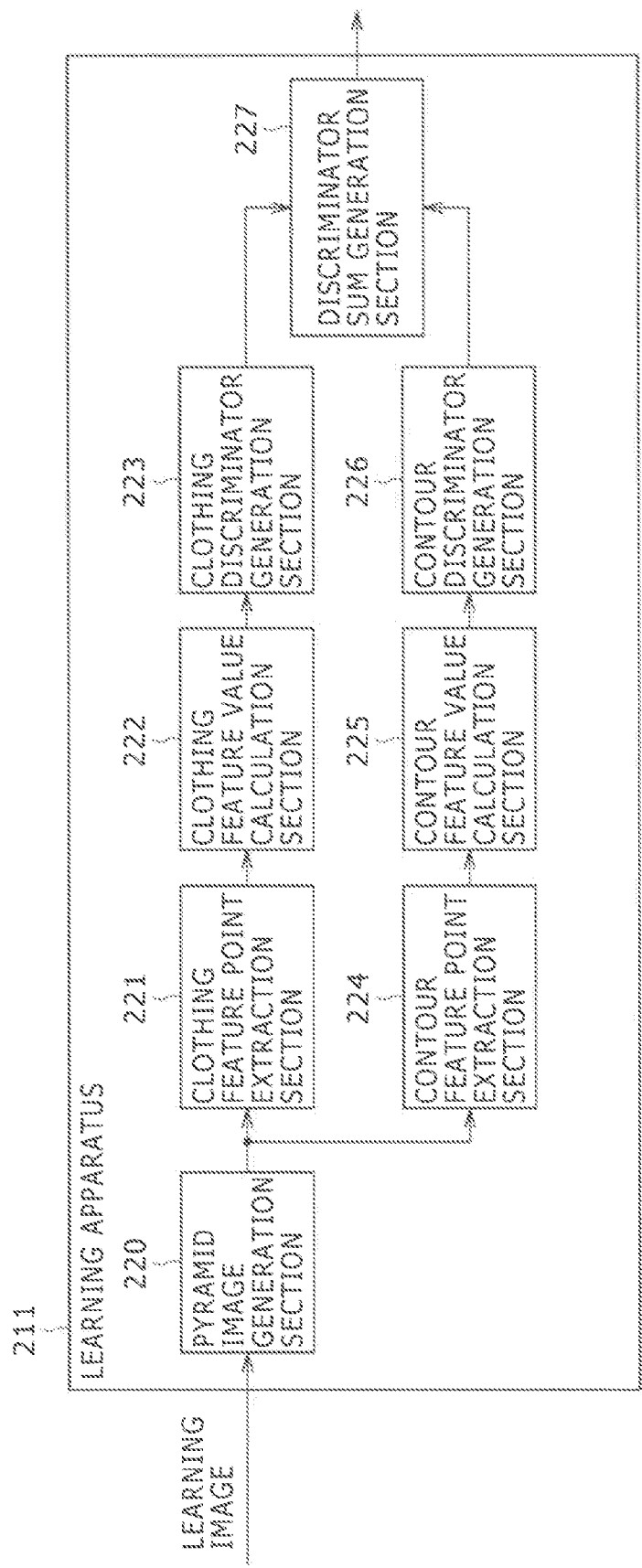
FIG. 10 is a block diagram showing a configuration of a learning apparatus.

Now, the recognizers 152 are described. FIG. 10 shows a learning apparatus 211 which generates the recognizers 152.

Referring to FIG. 10, the learning apparatus 211 generates a discrimination feature value and a discriminator sum which are used when a recognition apparatus 212, which is hereinafter described with reference to FIG. 24, carries out a process of recognizing, based on a learning image inputted thereto, whether or not an object substance exists on an image. The learning apparatus 211 records the discrimination feature value and the discriminator sum into a discriminator sum recording section 236, which is hereinafter described with reference to FIG. 24, of the recognition apparatus 212.

The learning apparatus 211 includes a pyramid image generation section 220, a clothing feature point extraction section 221, a clothing feature value calculation section 222, and a clothing discriminator generation section 223. The learning apparatus 211 further includes a contour feature point extraction section 224, a contour feature value calculation section 225, a contour discriminator generation section 226, and a discriminator sum generation section 227.

The pyramid image generation section 220 generates a plurality of images of resolutions different from each other from a learning image inputted thereto and supplies the images as pyramid images to the clothing feature point extraction section 221 and the contour feature point extraction section 224. For example, eight pyramid images of different resolutions from a level L1 to a level L8 are generated. In this instance, it is assumed that the pyramid image of the level 1 has the highest resolution and the resolution of the other pyramid images decreases in the order from the level L1 to the level L8.

The clothing feature point extraction section 221 extracts, from each of the images which configure the pyramid images generated by the pyramid image generation section 220 and are also referred to as learning images, several pixels as clothing feature points to be used when a clothing discriminator is to be generated. The extracted clothing feature points are supplied to the clothing feature value calculation section 222 together with the learning images. Here, the clothing discriminator is a strong discriminator generated by statistic learning and including a plurality of weak discriminators and is used to discriminate whether or not a region of an image of a person exists in an inputted image utilizing a feature of the clothing of the person.

The clothing feature value calculation section 222 carries out pairing of setting, from among the clothing feature points from the clothing feature point extraction section 221, a predetermined clothing feature point and a different clothing feature point as a pair. Further, the clothing feature value calculation section 222 calculates, for each pair of clothing feature points based on the learning images supplied from the clothing feature point extraction section 221, a clothing feature value representative of the distance in texture of two arbitrary regions. Then, the clothing feature value calculation section 222 supplies the determined clothing feature values and the learning images to the clothing discriminator generation section 223.

The clothing discriminator generation section 223 carries out a statistic learning process, for example, by Adaboost based on the learning images and the clothing feature values supplied thereto from the clothing feature value calculation section 222 to generate clothing discriminators for discriminating a person of an object substance. The clothing discriminator generation section 223 supplies the generated clothing discriminators to the discriminator sum generation section 227.

The contour feature point extraction section 224 extracts, from each of the images which configure the pyramid images generated by the pyramid image generation section 220 and also are learning images, several pixels as contour feature points to be used to generate a contour recognizer. Then, the contour feature point extraction section 224 supplies the extracted contour feature points and the learning images to the contour feature value calculation section 225. Here, a contour recognizer is a strong recognizer generated by statistic learning and formed from a plurality of weak discriminators, and is used to discriminate whether or not a region of an image of a person exists in the inputted image utilizing a contour of a person.

The contour feature value calculation section 225 carries out a filter process using, for example, a steerable filter based on the learning images from the contour feature point extraction section 224 to calculate, for each counter feature point, a contour feature value representative of an extracted contour. Then, the contour feature value calculation section 225 supplies the determined contour feature values and the learning images to the contour discriminator generation section 226. The contour discriminator generation section 226 carries out a statistic learning process, for example, by Adaboost based on the learning images and the contour feature values supplied thereto from the contour feature value calculation section 225 to generate contour discriminators for discriminating a person as an object substance. Further, the contour discriminator generation section 226 supplies the generated contour discriminators to the discriminator sum generation section 227.

The discriminator sum generation section 227 integrates the clothing discriminators from the clothing discriminator generation section 223 and the contour discriminators from the contour discriminator generation section 226 to generate a discriminator sum and supplies the generated discriminator sum to the discriminator sum recording section 236 of the recognition apparatus 212 hereinafter described so as to be recorded into the discriminator sum recording section 236. Further, the discriminator sum generation section 227 supplies the clothing feature values of the pairs of clothing feature points to be used to carry out recognition of an object substance using the discriminator sum and the counter feature values of the contour feature points as discrimination feature values to the discriminator sum recording section 236 so as to be recorded into the discriminator sum recording section 236.

[Configuration of the Clothing Discriminator Generation Section]

Figure 11:
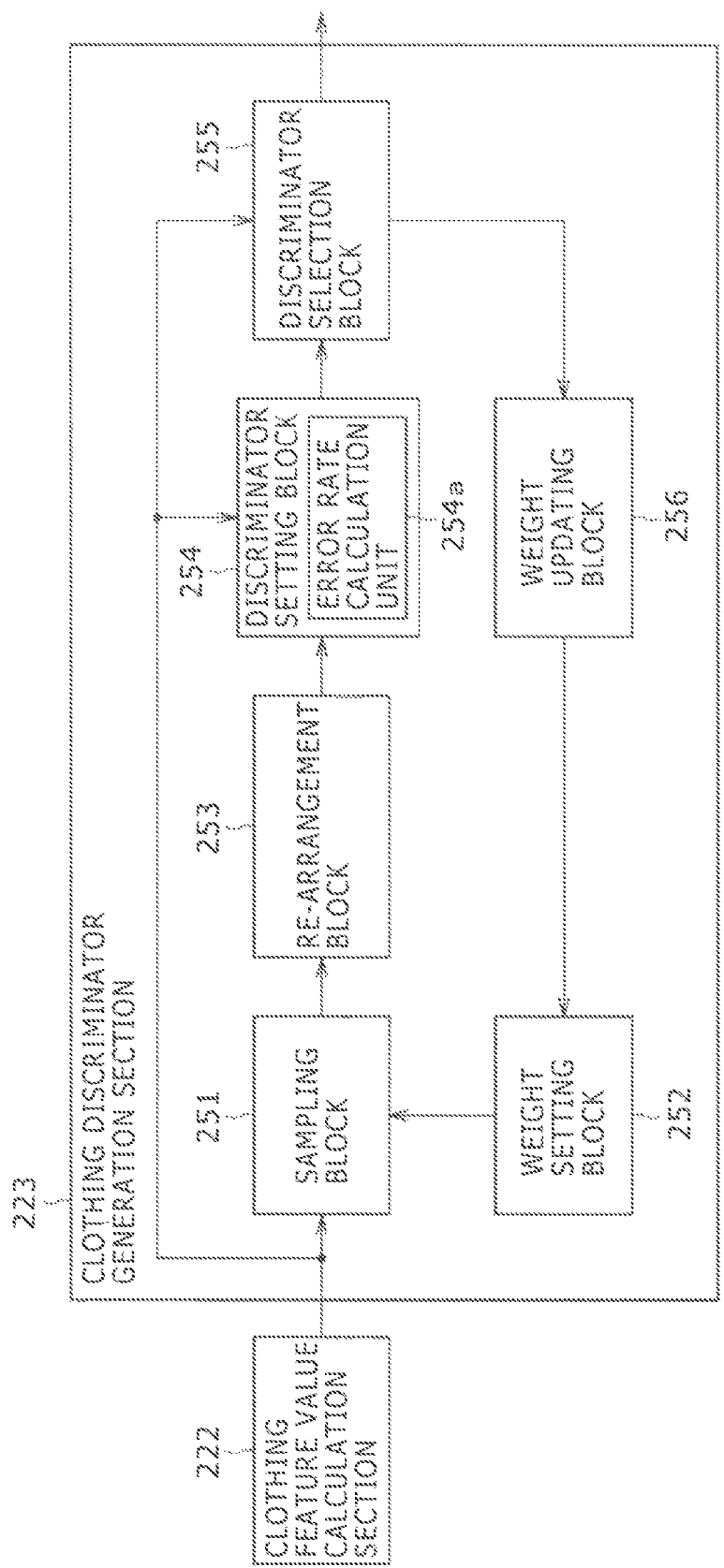
FIG. 11 is a block diagram showing an example of a detailed configuration of a clothing discriminator generation section shown in FIG. 10.

FIG. 11 shows an example of a detailed configuration of the clothing discriminator generation section 223 shown in FIG. 10. Referring to FIG. 11, the clothing discriminator generation section 223 includes a sampling block 251, a weight setting block 252, a re-arrangement block 253, a discriminator setting block 254, a discriminator selection block 255, and a weight updating block 256.

The sampling block 251 samples, for each pair of clothing feature points, M clothing feature points from among the clothing feature values of the pair of clothing feature points at the same point of a plurality of learning images in response to the weight of a learning image unit set by the weight setting block 252. Then, the sampling block 251 supplies the M sample clothing feature values to the re-arrangement block 253.

The re-arrangement block 253 re-arranges, for each pair of clothing feature points, the M sampled clothing feature values in an ascending order or in a descending order and supplies the re-arranged closing feature values to the discriminator setting block 254.

The discriminator setting block 254 controls, based on existence information representative of whether or not each learning image from which a clothing feature value is extracted includes an object substance to be recognized, an error rate calculation unit 254a thereof to calculate an error rate for each of the clothing feature values of the pairs re-arranged in the ascending order or the descending order while a threshold value is successively changing. The threshold value is set so that the error rate may be minimized. This threshold value is set as a weak discriminator. Further, the discriminator setting block 254 supplies the error rate for each weak recognizer to the discriminator selection block 255.

To each learning image, existence information (label) representative of whether or not the learning image includes an object substance is added. The discriminator setting block 254 carries out setting of a weak recognizer based on the existence information added to the learning image applied thereto from the clothing feature value calculation section 222.

The discriminator selection block 255 selects that one of the weak recognizers which exhibits a minimum error rate and updates the clothing discriminator formed from the weak discriminator. The discriminator selection block 255 supplies such final clothing discriminators and the clothing feature values corresponding to the weak discriminators to the discriminator sum generation section 227. Further, the discriminator selection block 255 calculates reliability values based on the error rates of the selected weak discriminators and supplies the reliability values to the weight updating block 256.

The weight updating block 256 re-calculates the weight of each learning image based on the reliability values supplied thereto and normalizes and updates the weights, and then supplies a result of the updating to the weight setting block 252. The weight setting block 252 sets weights for learning image units based on the updating result of the weights supplied thereto from the weight updating block 256.

[Configuration of the Contour Feature Value Calculation Section]

Figure 12:
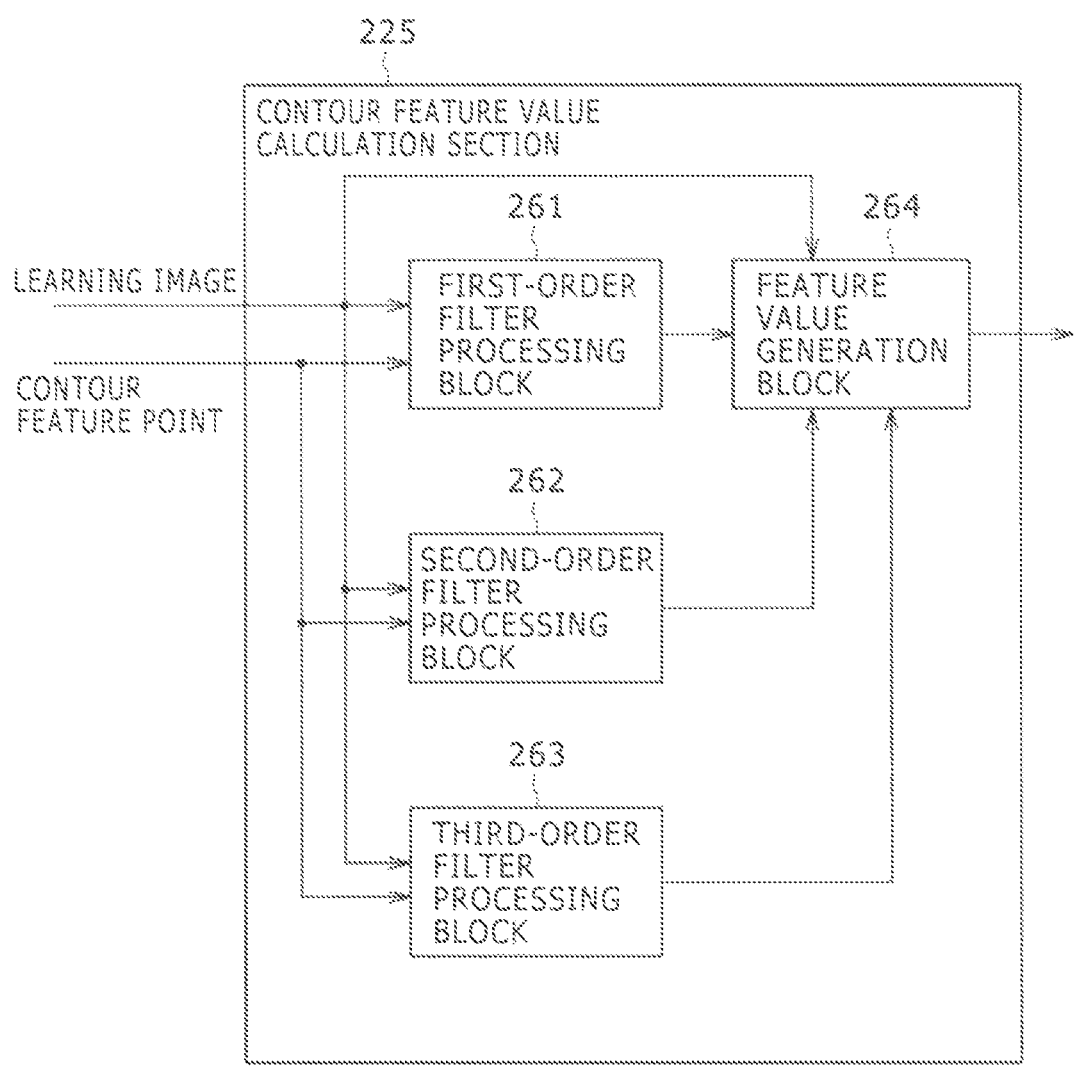
FIG. 12 is a block diagram showing an example of a detailed configuration of a contour feature value calculation section shown in FIG. 10.

FIG. 12 shows an example of a detailed configuration of the contour feature value calculation section 225. The contour feature value calculation section 225 includes a first-order filter processing block 261, a second-order filter processing block 262, a third-order filter processing block 263 and a feature value generation block 264. A learning image from the contour feature point extraction section 224 is supplied to the first- to third-order filter processing blocks 261 to 263 and the feature value generation block 264 while a contour feature point is supplied to the first- to third-order filter processing blocks 261 to 263.

The first-order filter processing block 261 applies, for each contour feature point supplied thereto, a filter process with a first derivation function $G_1$ of a Gaussian function G to the contour feature point to extract feature values and supplies the feature values to the feature value generation block 264. Here, the Gaussian function G is given by the following expression (1):

$$G = e^{-\frac{x^2+y^2}{2\sigma^2}} \tag{1}$$

where $\sigma$ is the Gaussian width while the first derivation function $G_1$ is given by the following expression (2):

$$G_1(\theta) = \cos(\theta)G_1(0°) + \sin(\theta)G_1(90°) \tag{2}$$

where θ is an arbitrary angle and represents the direction of a filter to be calculated.

For example, the first-order filter processing block 261 varies the Gaussian width σ of the Gaussian function G to three predetermined values such as, for example, Gaussian widths σ1, σ2 and σ3=1, 2 and 4 and calculates the expression (2) in regard to predetermined four directions such as, for example, θ=θ1, θ2, θ3 and θ4 for each of the Gaussian widths σ.

It is to be noted, however, that the direction θ is not limited to the four directions but may be any direction of eight directions, for example, of directions when π is divided equally into eight directions. Further, although a plurality of Gaussian widths are used to carry out processing in the past as described hereinabove, in the present embodiment, only it is necessary to prepare only one Gaussian width as hereinafter described, and there is no necessity to vary the Gaussian width. Therefore, although it is described above that "the Gaussian width is changed to three predetermined values such that the expression (2) is calculated with regard to four predetermine directions for each Gaussian width σ," in the present embodiment, only it is necessary to calculate the expression (2) with regard to the four predetermined directions for the set Gaussian width σ.

Therefore, since there is no necessity to carry out calculation for a plurality of Gaussian widths, the calculation amount can be reduced. This similarly applies also to the other filters such as, for example, the second-order filter processing block 262 and the third-order filter processing block 263.

The second-order filter processing block 262 carries out, for each of the contour feature points supplied thereto, a filter process for the contour feature point using a second derivation function $G_2$ of the Gaussian function G to extract a feature value, and supplies such extracted feature values to the feature value generation block 264. The following expression (3) represents the second derivation function $G_2$;

$$G_2(\theta) = k_{21}(\theta)G_2(0°) + k_{22}(\theta)G_2(60°) + k_{23}(\theta)G_2(120°) \quad (3)$$

where θ is an arbitrary angle, and the coefficient $k_{2i}(\theta)$ where i=1, 2 and 3 is a function represented by the following expression (4):

$$k_{2i}(\theta) = \frac{1}{3}\{1 + 2\cos(2(\theta - \theta i))\} \quad (4)$$

For example, the second-order filter processing block 262 calculates the expression (3) in regard to the four predetermined directions such as, for example, θ=θ1, θ2, θ3 and θ4 for a predetermined Gaussian width σ of the Gaussian function G.

The third-order filter processing block 263 carries out, for each of the contour feature points supplied thereto, a filter process for the contour feature point using a third derivation function $G_3$ of the Gaussian function G to extract a feature value, and supplies such extracted feature values to the feature value generation block 264. The following expression (5) represents the third derivation function $G_3$;

$$G_3(\theta) = k_{31}(\theta)G_3(0°) + k_{32}(\theta)G_3(45°) + k_{33}(\theta)G_3(90°) + k_{34}(\theta)G_3(135°) \quad (5)$$

where θ is an arbitrary angle, and the coefficient $k_{3i}(\theta)$ where i=1, 2 and 3 is a function represented by the following expression (6):

$$k_{3i}(\theta) = \frac{1}{4}\{2\cos(\theta - \theta i) + 2\cos(3(\theta - \theta i))\} \quad (6)$$

For example, the third-order filter processing block 263 calculates the expression (3) in regard to the four predetermined directions such as, for example, θ=θ1, θ2, θ3 and θ4 for a predetermined Gaussian width σ of the Gaussian function G.

The feature value generation block 264 receives the feature values, supplied from the first-order filter processing block 261, second-order filter processing block 262 and third-order filter processing block 263, of the contour feature points calculated with regard to the four directions θ. Then, the feature value generation block 264 arranges the totaling 12 (=3 (order number)×4 (direction number)) feature values supplied thereto to determine them as contour feature values at the contour feature points.

Since a plurality of images of different resolutions are supplied from the pyramid image generation section 220 to the filter processing blocks 261, 262 and 263, also the feature values of the contour feature points calculated with regard to the four directions θ from the images are supplied. The feature values supplied depend upon the number of images to be generated by the pyramid image generation section 220. For example, in the case where eight images from the level 1 to the level 8 are to be generated, feature values of the contour feature points calculated with regard to the four directions θ for the eight images are supplied.

The feature value generation block 264 supplies the generated contour feature values and the learning image supplied thereto to the contour discriminator generation section 226.

In this manner, the contour feature value calculation section 225 uses filters, that is, basis functions, having a selectivity in the direction θ and obtained by differentiating the Gaussian function to extract feature values or a contour which are different among different order numbers in differentiation. The contour feature value calculation section 225 determines the thus extracted feature values as contour feature values.

Figure 13:
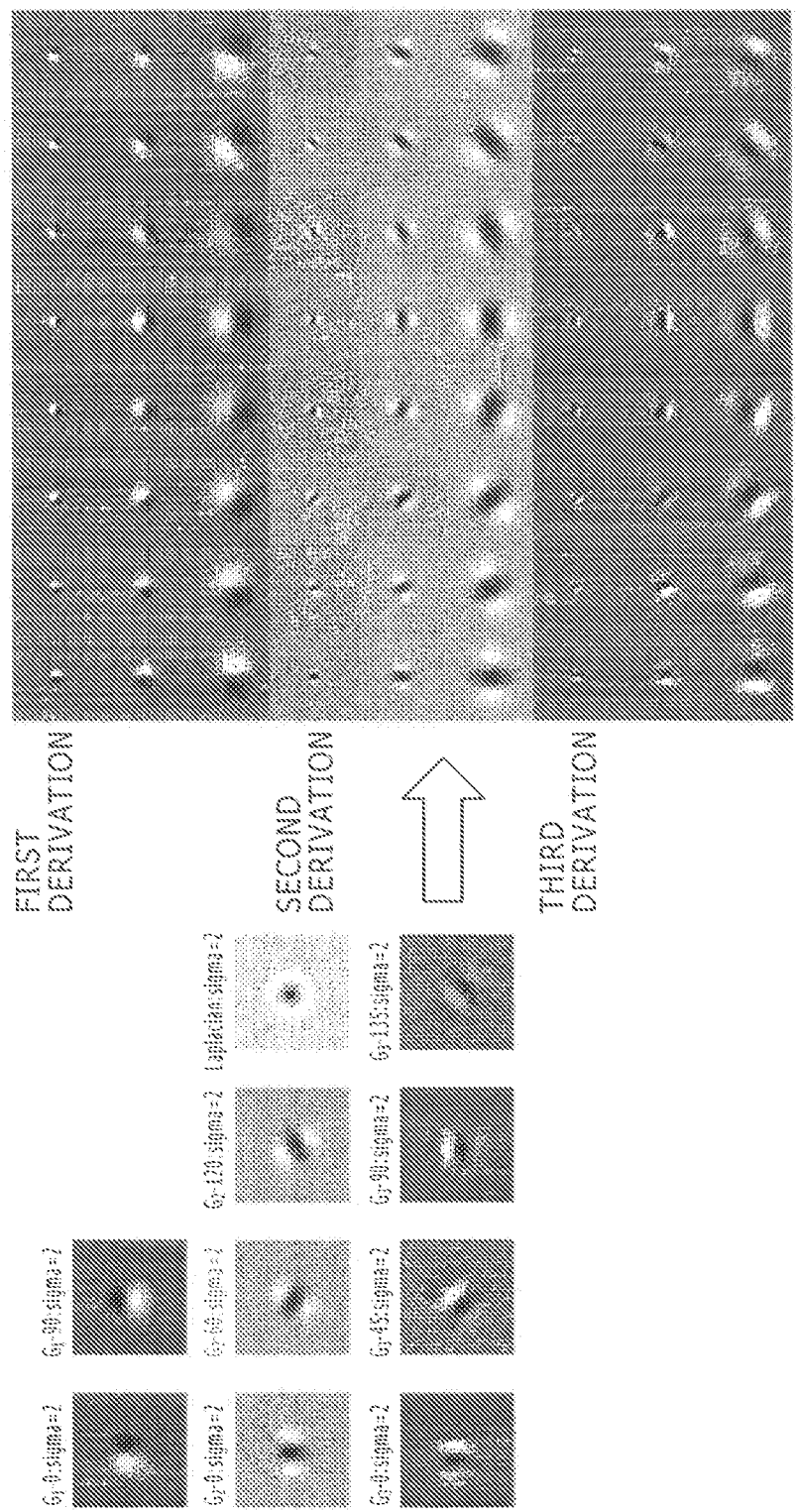
FIG. 13 is a schematic view illustrating a steerable filter.

In the case where a steerable filter is used for extraction of a contour feature value, if filters having different directions θ and different Gaussian widths σ from each other are prepared as seen in FIG. 13, then a filter for an arbitrary direction θ, that is, a derivation function $G_n$ (where n=1, 2, 3) of the Gaussian function G, can be represented by a linear coupling of the filters.

Further, in FIG. 13, images in an uppermost one of horizontal rows on the right side represent those in the case where θ in the first derivation function $G_1(\theta)$ in the case where the Gaussian width σ is σ=1 is set to 0, 1/8π, 2/8π, 3/8π, 4/8π, 5/8π, 6/8π and 7/8π in order from the left side.

Similarly, images in different horizontal rows on the right side represent, in order in the downward direction from the second uppermost row, the first derivation function $G_1(\theta)$ in the case where the Gaussian width σ is σ=2; the first derivation function $G_1(\theta)$ in the case where the Gaussian width σ is σ=4; the second derivation function $G_2(\theta)$ in the case where the Gaussian width σ is σ=1; the second derivation function $G_2(\theta)$ in the case where the Gaussian width σ is σ=2; the second derivation function $G_2(\theta)$ in the case where the Gaussian width σ is σ=4; the third derivation function $G_3(\theta)$ in the case where the Gaussian width σ is σ=1; the third derivation function $G_3(\theta)$ in the case where the Gaussian width σ is σ=2; and the third derivation function $G_3(\theta)$ in the case where the Gaussian width σ is σ=4. Further, the images in the rows represent those in the case where the direction θ in the derivation functions is set to 0, 1/8π, 2/8π, 3/8π, 4/8π, 5/8π, 6/8π and 7/8π in order from the left side.

For example, if the first derivation function $G_1(0°)$ and the first derivation function $G_1(90°)$ of the filters on the left side in FIG. 13 are used, then the first derivation function $G_1(\theta)$ in the directions θ in the second uppermost row on the right side in FIG. 13 can be represented. Similarly, if the second derivation function $G_2(\theta)$ on the left side in FIG. 13 is used, then the second derivation function $G_2(\theta)$ in the directions θ shown in the fifth row from above on the right side in FIG. 13 can be represented. Further, if the third derivation function $G_3(\theta)$ on the left side in FIG. 13 is used, then the third derivation function $G_3(\theta)$ in the directions θ shown in the eighth row from above on the right side in FIG. 13 can be represented. In short, a derivation function in an arbitrary direction in any dimension can be represented, if a number of basis functions greater by one than the dimension number are available, by a linear coupling of the basis functions.

Figure 14:
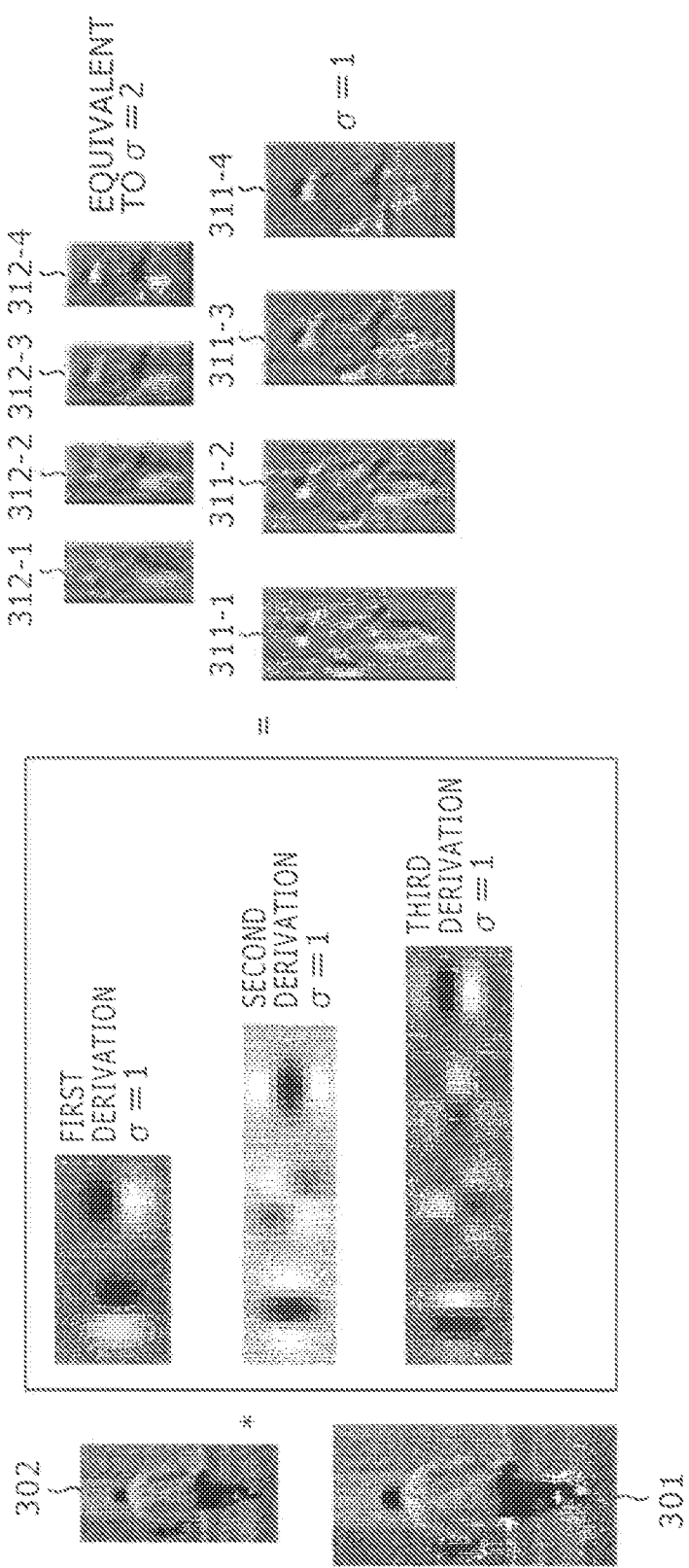
FIG. 14 is a schematic view illustrating a result when a filter process is carried out for an image.

FIG. 14 illustrates a result obtained by carrying out a filter process for an image which includes a person using a derivation function of the Gaussian function G. In FIG. 14, images of an object of the filter process are shown in the left side; filters are shown centrally; and images after the filter process are shown on the right side.

The two images shown on the left side in FIG. 14 configure pyramid images and are images of different resolutions. As described hereinabove, the pyramid image generation section 220 generates images of different resolutions of, for example, the levels L1 to L8. On the left side in FIG. 14, an image 301 of the resolution of the level L1 and another image 302 of the resolution of the level L2 are shown.

The filters shown centrally in FIG. 14 are an example of filters of the first derivation function $G_1$, second derivation function $G_2$ and third derivation function $G_3$ where the Gaussian width σ is σ=1. The filters shown centrally in FIG. 14 illustratively show part of the filters illustrated in FIG. 13.

If an image shown on the left side in FIG. 14 is subjected to a filter process using, for example, the filter of the third derivation function $G_3$ from above the filters shown centrally in FIG. 14, then images shown on the right side in FIG. 14 are generated. In particular, if the filter of the third derivation function $G_3$ is used to carry out a filter process for the image 301, then images 311-1 to 311-4 are generated. On the other hand, if the third derivation filter is used to carry out a filter process for the image 302, then images 312-1 to 312-4 are generated.

Since the images 311-1 to 311-4 are obtained by carrying out a filter process using the filter of the third derivation function $G_3$ where the Gaussian width σ is 1 (σ=1), they are images obtained when a filter process is carried out using a filter whose Gaussian width σ is 1.

Similarly, since the images 312-1 to 312-4 are obtained by carrying out a filter process using the filter of the third derivation function $G_3$ where the Gaussian width σ is 1 (σ=1), they are images obtained when a filter process is carried out using a filter whose Gaussian width σ is 1.

However, the images 312-1 to 312-4 are images obtained by a filter process of the image 302. The image 302 is a reduced image of the image 301. In such an instance, the images 312-1 to 312-4 can be made images corresponding to those images which are generated by carrying out a filter process using a filter of the third derivation function $G_3$ whose Gaussian width σ is 2 (σ=2). In other words, images corresponding to those images which are generated when a filter process is carried out for the image 301 using a filter of the third derivation function $G_3$ whose Gaussian width σ is 2 (σ=2) are the images 312-1 to 312-4.

In other words, if a filter process is carried out for a pyramid image, then an image equivalent to that which is obtained when a filter process is carried out using a filter of a different Gaussian width can be obtained. For example, in comparison with the mathematical calculation amount or the processing burden when a filter is prepared in advance for each of different Gaussian widths to carry out a filter process, the mathematical calculation amount or the processing burden when a filter of a single Gaussian width is prepared in advance to carry out a filter process for a pyramid image as described above is reduced remarkably.

In other words, by generating pyramid images and carrying out a filter process with a single Gaussian width, the processing time can be reduced remarkably. Therefore, if such a technique as just described is used to detect an object substance such as a person from within an image, then the processing time is reduced to such a degree that the object substance can be detected on the real time basis from an image.

The contour feature value calculation section 225 generates an image obtained by averaging a plurality of images equivalent to those images which are obtained by using filters of different Gaussian widths σ to carry out a filter process in this manner. From the generated average image, a contour of a person can be confirmed. Thus, a contour of a person can be extracted appropriately from images by a filter process using the different filters.

[Learning Process for Discriminator Sum Generation]

Figure 15:
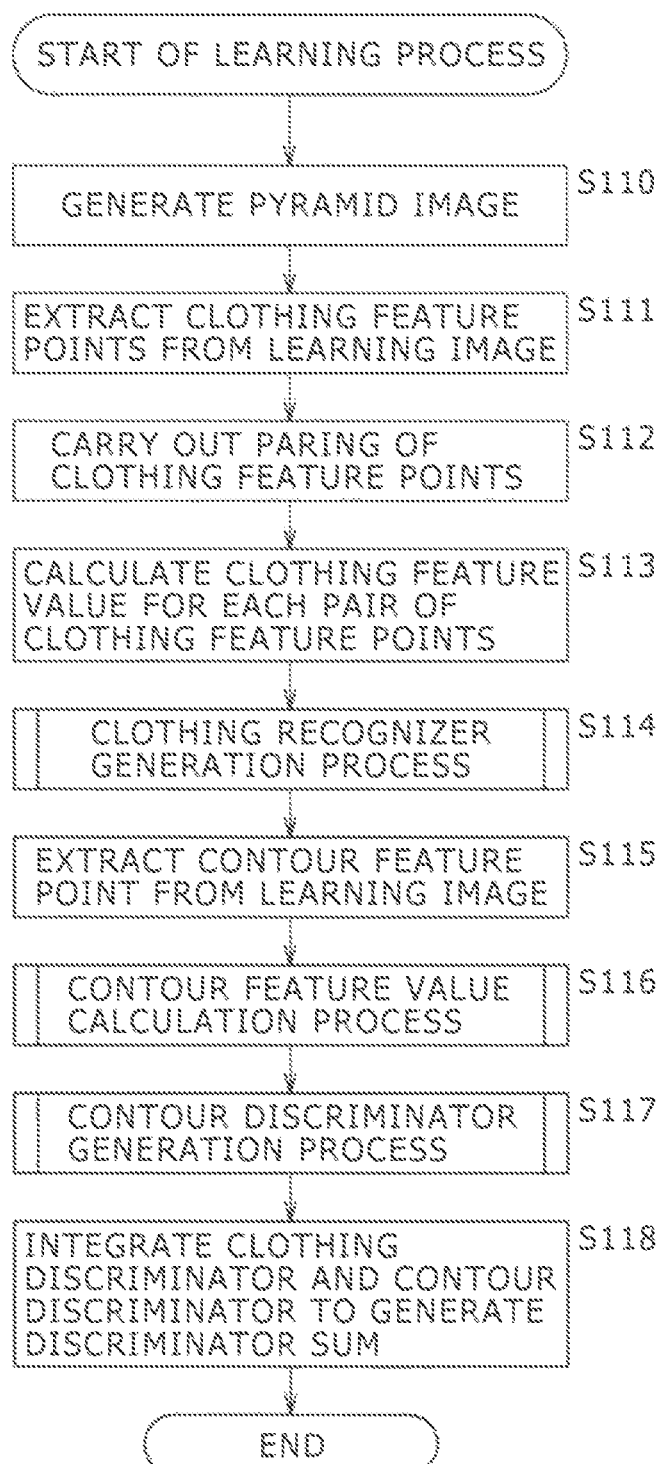
FIG. 15 is a flow chart illustrating a learning process.
Figure 16:
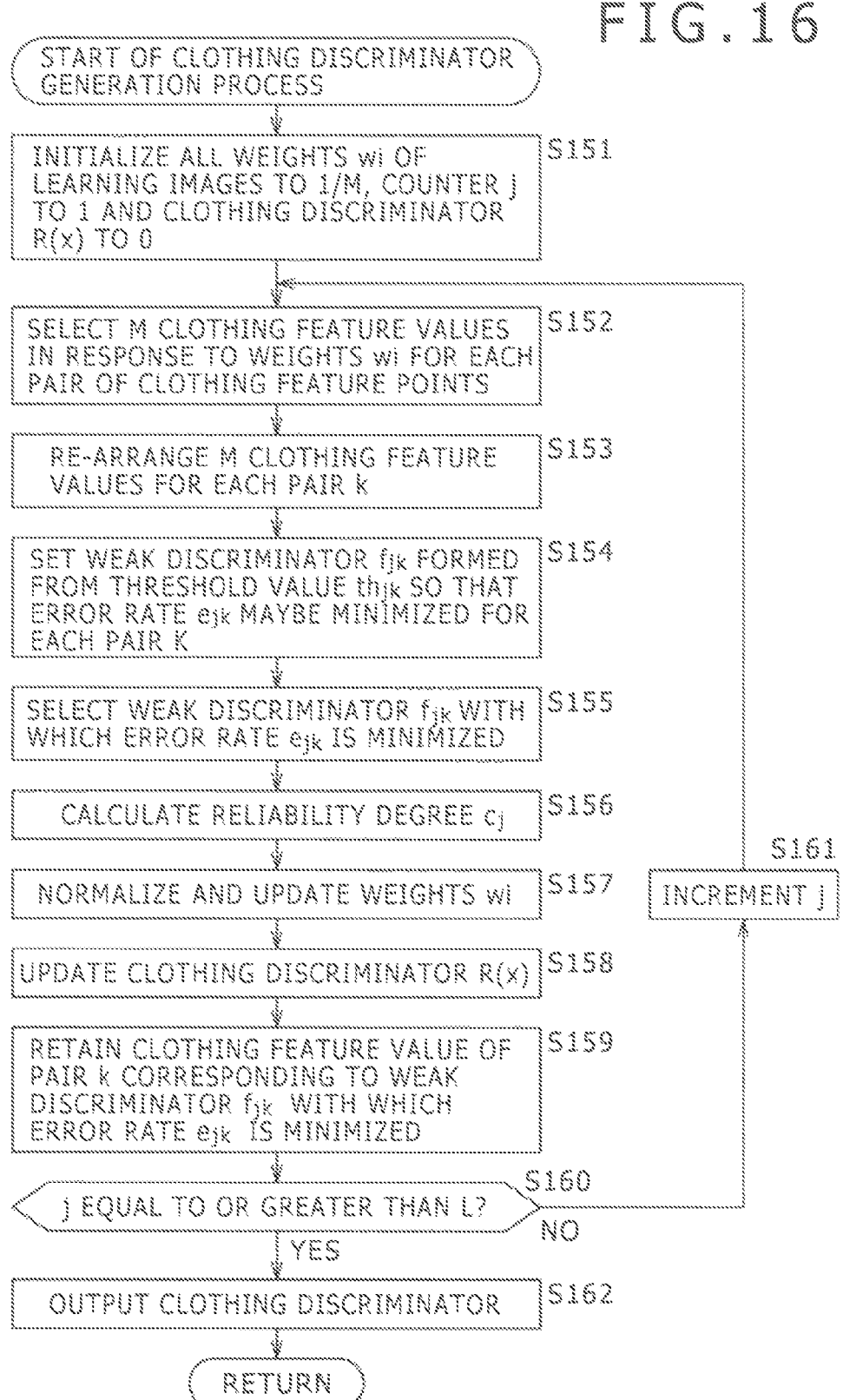
FIG. 16 is a flow chart illustrating a clothing discriminator generation process.
Figure 17:
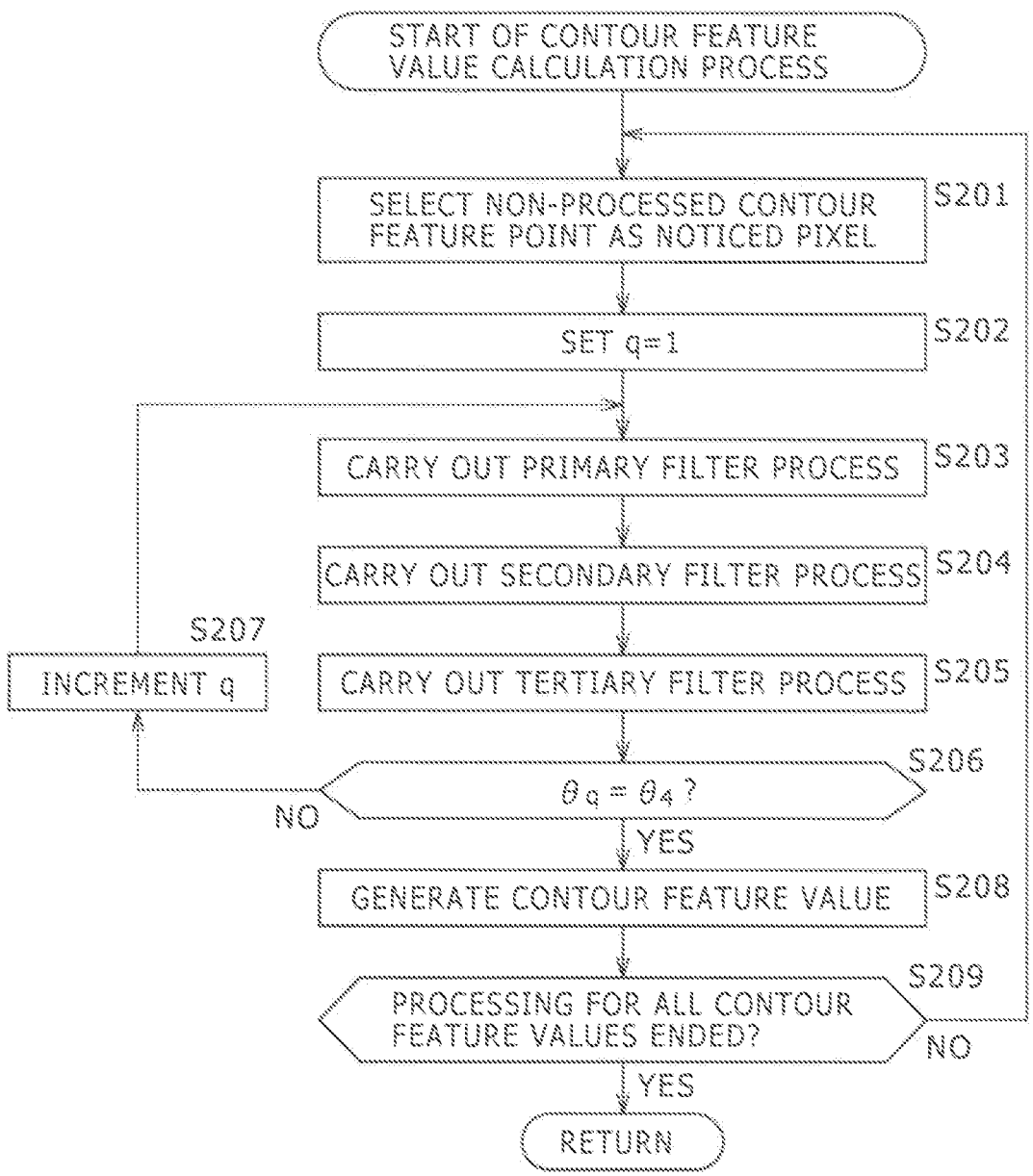
FIG. 17 is a flow chart illustrating a contour feature value calculation process.

Now, a learning process carried out by the learning apparatus 211 is described with reference to FIGS. 15 to 17. If a learning image is inputted to the learning apparatus 211 and an instruction to generate a discriminator sum is issued, then the learning apparatus 211 starts a learning process and generates a discriminator sum by statistic learning. FIG. 15 illustrates the learning process and FIG. 16 illustrates a clothing discriminator generation process while FIG. 17 illustrates a contour feature value calculation process.

Referring first to FIG. 15, at step S110, the pyramid image generation section 220 generates pyramid images from the inputted learning image. As described hereinabove, the pyramid image generation section 220 generates pyramid images of hierarchies of, for example, eight resolutions from the level L1 to the level L8, and supplies the generated images to the clothing feature point extraction section 221 and the contour feature point extraction section 224. The clothing feature point extraction section 221 and the contour feature point extraction section 224 individually determine one of the pyramid images supplied thereto, which are images of different resolutions from each other, as a learning image of a processing object to execute processes at steps beginning with step S111. Also for the other images, the processes at the steps beginning with step S111 are executed similarly.

At step S111, the clothing feature point extraction section 221 extracts clothing feature points from the learning image supplied thereto and supplies the extracted clothing feature points and the learning image to the clothing feature value calculation section 222.

At step S112, the clothing feature value calculation section 222 carries out, based on the clothing feature points and the learning image supplied thereto from the clothing feature point extraction section 221, pairing of the clothing feature points.

At step S113, the clothing feature value calculation section 222 calculates a clothing feature value for each pair of the clothing feature points paired with each other by the pairing and supplies the calculated clothing feature values to the clothing discriminator generation section 223.

Figure 18:
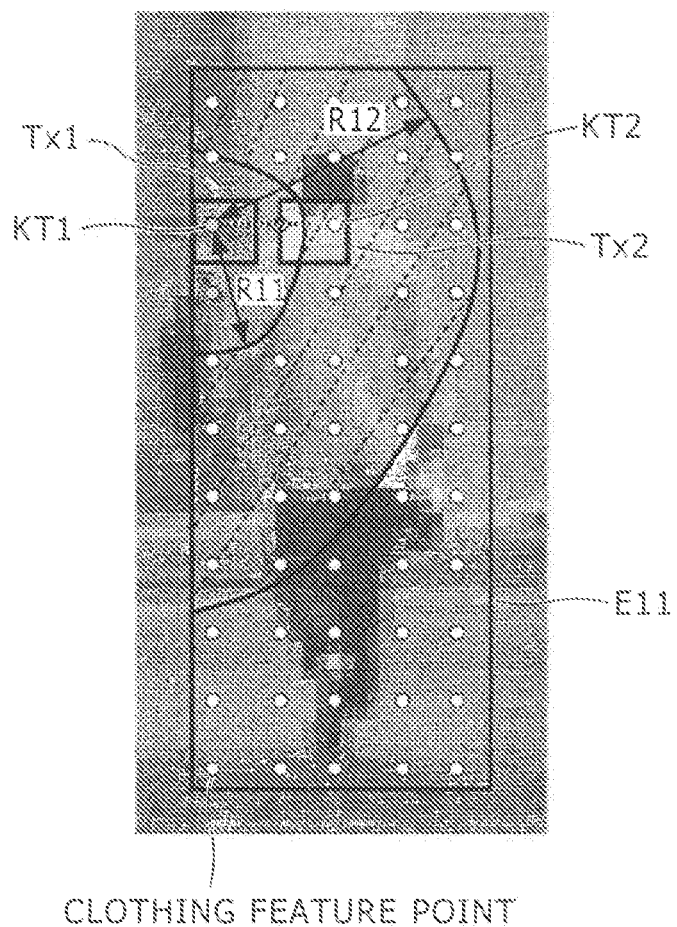
FIG. 18 is a schematic view illustrating extraction of clothing feature points.

For example, if a learning image shown in FIG. 18 is inputted to the clothing feature point extraction section 221, then the clothing feature point extraction section 221 extracts clothing feature points from the learning image based on a margin determined in advance and a sampling skip number. It is to be noted that each circle on the learning image shown in FIG. 18 indicates a pixel determined as a clothing feature point.

Here, the margin is a number of pixels from an end of the learning image to a region of an object of extraction of a clothing feature value in the learning image. Meanwhile, the sampling skip number is a distance between pixels on the learning image which are determined as clothing feature points.

Accordingly, for example, if the margin is five pixels and the sampling skip number is five pixels, then the clothing feature point extraction section 221 excludes a region of pixels at positions within five pixels from an end of the learning image from the learning image and determines the remaining region E11 as an object of extraction of a clothing feature point. Then, the clothing feature point extraction section 221 extracts, from among the pixels in the region E11, those pixels at positions which are spaced by a five-pixel distance from each other as clothing feature points. In particular, the distance between those clothing feature points positioned adjacent each other in the vertical direction or in the horizontal direction is five pixels, and the clothing feature points are included in the region E11.

Then, the clothing feature value calculation section 222 carries out pairing of the clothing feature points based on a minimum radius and a maximum radius determined in advance. For example, in the case where the minimum radius is R11 and the maximum radius is R12, when attention is paid to a predetermined clothing feature point KT1, the clothing feature value calculation section 222 pairs, with regard to all clothing feature points whose distance from the clothing feature point KT1 is greater than the minimum radium R11 but is within the maximum radius R12, each of the clothing feature points and the clothing feature point KT1 with each other.

For example, in the case where the number of those clothing feature points whose distance from the clothing feature point KT1 is greater than the minimum radium R11 but is within the maximum radius R12 is N, N pairs of clothing feature points are obtained. The clothing feature value calculation section 222 carries out such pairing with a different clothing feature point for all of the clothing feature points.

Further, the clothing feature value calculation section 222 calculates, with regard to each of the pairs of clothing feature points obtained by the pairing, the distance in texture between regions of a predetermined shape and a predetermined size centered at each of the clothing feature points of the pair.

For example, in the case where a clothing feature value regarding the pair of the clothing feature point KT1 and a clothing feature point KT2 shown in FIG. 18 is to be determined as the SSD (Sum of Square Distance), the clothing feature value calculation section 222 determines a predetermined region centered at the clothing feature point KT1 as a region Tx1 and determines another region centered at the clothing feature point KT2 and having the same size equal to that of the region Tx1 as a region Tx2. Then, the clothing feature value calculation section 222 determines an absolute value sum of differences between pixel values of pixels in the region Tx1 and pixel values of pixels in the region Tx2 corresponding to the pixels in the region Tx1. Then, the clothing feature value calculation section 222 determines the absolute value sum of the differences as a clothing feature value.

It is to be noted that the clothing feature value is not limited to the SSD but may be the SAD (Sum of Absolute Distance), a normalization correlation or the like.

In this manner, the clothing feature value calculation section 222 determines a clothing feature value with regard to each of the pairs of clothing feature points extracted from the learning image. More particularly, to the learning apparatus 211, a plurality of learning images including several learning images which include an object substance and several learning images which do not include the object substance are inputted. Then, for each of the inputted learning images, extraction of clothing feature points and calculation of clothing feature values are carried out.

Figure 19:
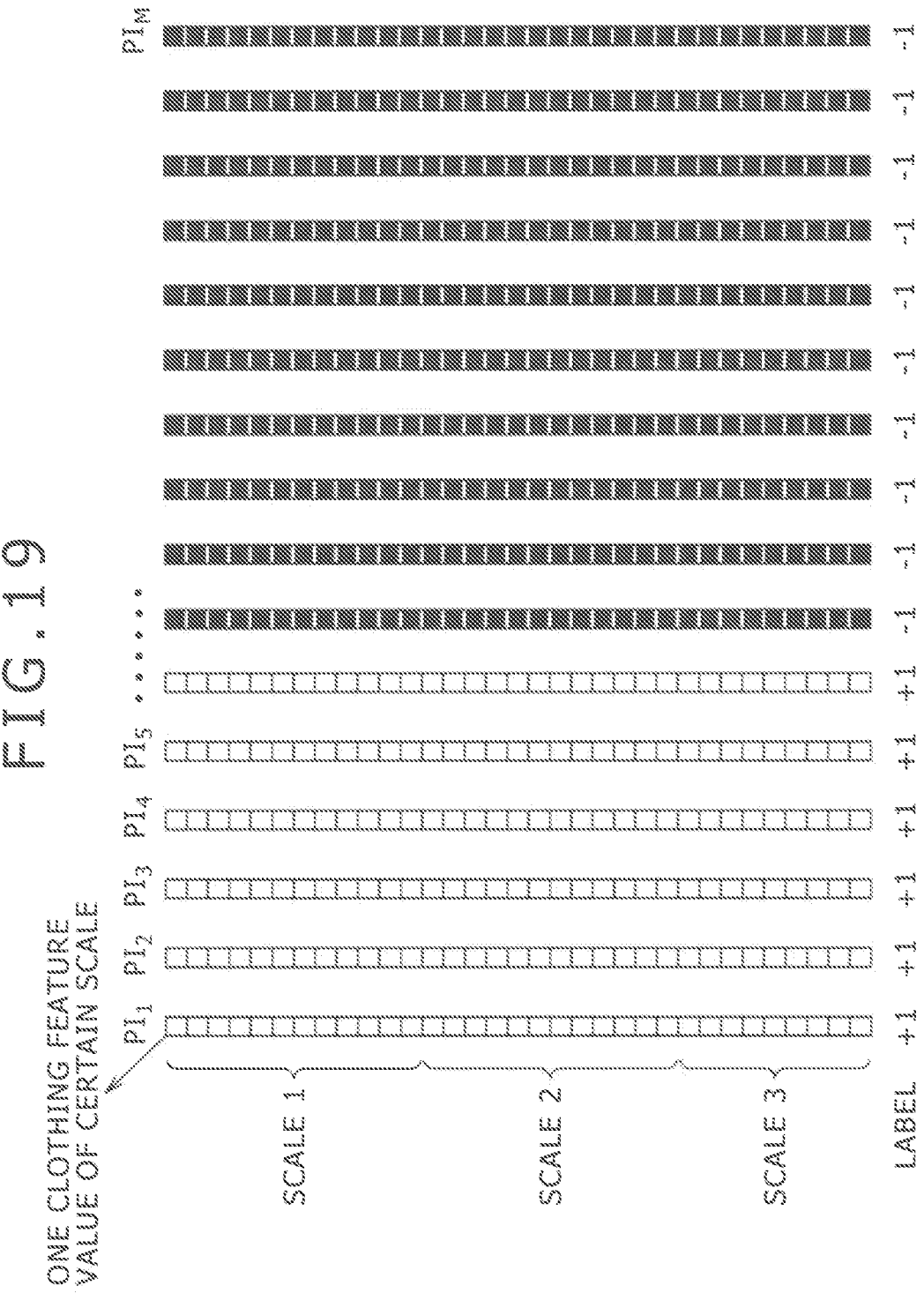
FIG. 19 is a schematic view illustrating clothing feature values.

For example, if M (M is a natural number) learning images $PI_1$ to $PI_M$ are inputted to the learning apparatus 211, then a clothing feature value is obtained for each pair of clothing feature points with regard to the M learning images $PI_i$ (where $1 \leq i \leq M$) as seen in FIG. 19.

In FIG. 19, one quadrangle represents a clothing feature value of one pair of clothing feature points. Further, a column of quadrangles arranged in the vertical direction represents a column of clothing feature values obtained from the learning image $PI_i$ (where $1 \leq i \leq M$). In one column, a number of clothing feature values equal to the number of pairs of clothing feature points obtained from the learning image $PI_i$ are arranged. In other words, the number of pairs of clothing feature points obtained from the learning image $PI_i$ is a dimension of the clothing feature values of the learning image $PI_i$.

A learning image indicates pyramid images as described above. FIG. 19 indicates a state when three pyramid images are generated from one image and then processed. In other words, FIG. 19 illustrates feature value vectors upon learning when the level of the multiplex resolution is set to 3 in a manner in which it can be recognized readily.

Referring to FIG. 19, the term scale represents a scale coefficient. The scale coefficient represents a reduction ratio at which the size of an image is to be reduced on the next level. For example, the scale 1 represents that the scale coefficient is 1. In one column of FIG. 19, a number of clothing feature values equal to the number of pairs of clothing feature values obtained from a plurality of learning images $PI_i$ which configure pyramid images are juxtaposed.

Further, on the lower side in FIG. 19 of each column of clothing feature values of each learning image $PI_i$, a label or existence information representative of whether or not the learning image $PI_i$ includes an object substance. For example, the label "+1" shown on the lower side in FIG. 19 of a column of clothing feature values of a learning image $PI_i$ represents that an object substance is included in the learning image $PI_i$. On the other hand, the label "−1" shown on the lower side in FIG. 19 of a column of clothing feature values of a learning image $PI_M$ represents that an object substance is not included in the learning image $PI_M$.

Referring back to FIG. 15, after clothing feature values are determined at step S113, the clothing discriminator generation section 223 carries out a clothing discriminator generation process to generate clothing discriminators.

[Clothing Discriminator Generation Apparatus]

Here, details of the clothing discriminator generation process at step S114 of FIG. 15 is described with reference to FIG. 16.

At step S151, the weight setting block 252 shown in FIG. 12 initializes all of, for example, weights Wi for learning images $PI_i$ ($1 \leq i \leq M$) shown in FIG. 19 to 1/M and the discriminator selection block 255 initializes a counter j to 1 and initializes a clothing discriminator R(x), which is the sum of weak discriminators, to 0.

Here, i is used to discriminate a learning image $PI_i$ shown in FIG. 19 and satisfies $1 \leq i \leq M$. By the process at step S151, all of the weights Wi of all learning images $PI_i$ have a normalized equal weight (=1/M). Meanwhile, the counter j indicates a number of times determined in advance for updating the clothing discriminator R(x).

At step S152, the sampling block 251 selects, for each pair of clothing feature points, M clothing feature values from among the clothing feature values of the pairs of clothing feature values at the same positions of the plural learning images $PI_i$ in accordance with the weights Wi of the learning images $PI_i$. Then, the sampling block 251 supplies the selected M clothing feature values to the re-arrangement block 253.

Figure 20:
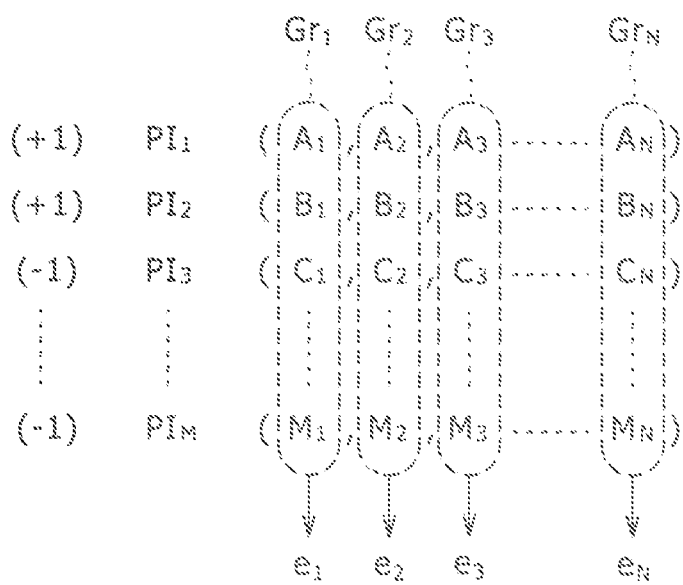
FIG. 20 is a schematic view illustrating sampling of a clothing feature value for each pair of clothing feature points.

For example, it is assumed that clothing feature values of M learning images $PI_1$ to $PI_M$ are supplied from the clothing feature value calculation section 222 to the sampling block 251 as seen in FIG. 20. In FIG. 20, clothing feature values obtained from the learning images $PI_i$ (where $1 \leq i \leq M$) are juxtaposed in the horizontal direction, and the numeral "+1" or "−1" on the left side in FIG. 20 of a character $PI_i$ representative of the learning image indicates a label or existence information applied to the learning image $PI_i$.

In particular, $A_1, A_2, A_3, \ldots, A_N$ juxtaposed horizontally in the uppermost row in FIG. 20 individually represent clothing feature values of pairs of clothing feature points of the learning image $PI_1$. Meanwhile, the character "+1" on the left side in FIG. 20 of the character "$PI_1$" representative of the learning image $PI_1$ represents a label representing that an object substance is included in the learning image $PI_1$.

Similarly, $B_1, B_2, B_3, \ldots, B_N$ juxtaposed horizontally in the second uppermost row in FIG. 20 individually represent clothing feature values of pairs of clothing feature points of the learning image $PI_2$. Meanwhile, the character "+1" on the left side in FIG. 20 of the character "$PI_2$" representative of the learning image $PI_2$ represents a label representing that an object substance is included in the learning image $PI_2$.

Further, $C_1, C_2, C_3, \ldots, C_N$ juxtaposed horizontally in the third row from above in FIG. 20 individually represent clothing feature values of pairs of clothing feature points of the learning image $PI_3$. Meanwhile, the character "−1" on the left side in FIG. 20 of the character "$PI_3$" representative of the learning image $PI_3$ represents a label representing that an object substance is not included in the learning image $PI_3$. Furthermore, $M_1, M_2, M_3, \ldots, M_N$ juxtaposed horizontally in the Mth row from above in FIG. 20 individually represent clothing feature values of pairs of clothing feature points of the learning image $PI_M$. Meanwhile, the character "−1" on the left side in FIG. 20 of the character "$PI_M$" representative of the learning image $PI_M$ represents a label representing that an object substance is not included in the learning image $PI_M$.

In this manner, in the example of FIG. 20, from one learning image $PI_i$, clothing feature values individually of N pairs of clothing feature points are obtained. Further, in FIG. 20, M clothing feature values $A_k$ (where $1 \leq k \leq N$) juxtaposed in the vertical direction form one group $Gr_k$, and those clothing feature values which belong to this group $Gr_k$ are those of the pairs of clothing feature points at the same positions of the learning images $PI_i$.

For example, the group $Gr_1$ includes the clothing feature values $A_1$ to $M_1$ juxtaposed in the vertical direction, and two clothing feature points paired with each other in the learning image $PI_1$ from which the clothing feature value $A_1$ is determined and other two clothing feature points belonging to the group $Gr_1$, for example, two clothing feature points paired with each other of the learning image $PI_M$ from which the clothing feature value $M_1$ determined, are positioned at the same positions on the learning images. It is to be noted that a pair of clothing feature points of the learning images $PI_i$ from which clothing feature values belonging to the group $Gr_k$ ($1 \leq k \leq N$) are determined is hereinafter referred to as pair k.

If the clothing feature values for each learning image $PI_i$ shown in FIG. 20 are supplied to the sampling block 251, then the sampling block 251 selects, for each pair k, that is, for each group $Gr_k$, M clothing feature values from among the clothing feature values which belong to the group by lottery in response to the weights Wi of the learning images $PI_i$. For example, the sampling block 251 selects M clothing feature values from among the clothing feature values $A_1$ to $M_1$ belonging to the group $Gr_1$ in response to the weights Wi. It is to be noted that, in initial processing, all weights Wi are 1/M and equal to each other, and therefore, when M clothing feature values are selected, stochastically all clothing feature values are selected. Therefore, it is assumed here that, in initial processing, all clothing feature values are selected in each group $Gr_k$. Naturally, actually same clothing feature values may be selected doubly.

It is to be noted that also it is possible to use the weight Wi for error calculation for each pair of clothing feature points. In this instance, an error value is multiplied by a data weight coefficient, that is, the weight Wi, to carry out error calculation.

At step S153, the re-arrangement block 253 re-arranges, for each of the N groups $Gr_k$, M clothing feature values selected for each pair k in an ascending order or in a descending order and supplies the re-arranged M clothing feature values to the discriminator setting block 254. For example, M clothing feature values selected from among the clothing feature values belonging to the group $Gr_1$ shown in FIG. 20 are re-arranged in order.

At step S154, the discriminator setting block 254 controls, based on the existence information, that is, the label, attached to the learning image supplied from the clothing feature value calculation section 222, the error rate calculation unit 254a to calculate an error rate $e_{jk}$ as represented by the expression (7) given below for each group $Gr_k$, that is, for each pair k of clothing feature values, while successively changing the threshold value. The discriminator setting block 254 thereby sets the threshold value so that the error rate $e_{jk}$ exhibits a minimum value.

Here, the threshold value $th_{jk}$ for each pair k of clothing feature values becomes one weak discriminator $f_{jk}$. The discriminator setting block 254 supplies the error rates $e_{jk}$ for the individual weak discriminators $f_{jk}$ to the discriminator selection block 255. In particular, N weak discriminators $f_{jk}$ are set for each of N pairs k, and an error rate $e_{jk}$ is determined for each of the N weak discriminators $f_{jk}$. It is to be noted that the weak discriminator $f_{jk}$ is a function which outputs "+1" in the case where an object substance to be recognized is included but outputs "−1" in the case where an object substance to be recognized is not included.

Figure 21:
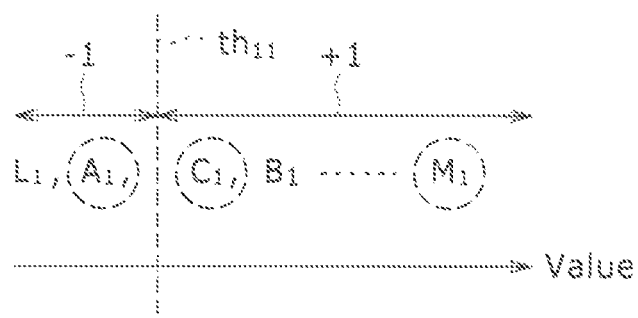
FIG. 21 is a schematic view illustrating setting of a weak discriminator.

For example, in the case where j=1 and the clothing feature values of the pair k=1 of clothing feature points are arranged in the ascending order like $L_1, A_1, C_1, B_1, \ldots, M_1$ or in the descending order as shown in FIG. 21, the threshold value $th_{11}$ is set to a value between the clothing feature values $A_1$ and $C_1$. Then, within a range lower than the threshold value $th_{11}$, it is recognized that an object substance to be recognized does not exist (range represented by "−1"), but within another range higher than the threshold value $th_{11}$, it is recognized that an object substance to be recognized exists (range represented by "+1"). In this instance, since the clothing feature value $A_1$ surrounded by a broken line in FIG. 21 is a clothing feature value of a learning image which includes an object substance to be recognized, this is regarded as an error. On the other hand, since the clothing feature value $C_1$ or $M_1$ is a clothing feature value of a learning image which does not include an object substance to be recognized conversely, this is regarded as an error.

In the example of FIG. 21, the threshold value $th_{11}$ is set to a position at which the error rate $e_{jk}$ exhibits a minimum value. For example, if the threshold value $th_{11}$ illustrated in FIG. 21 is not at a position at which the error rate $e_{jk}$ exhibits a minimum value, then the discriminator setting block 254 changes the position of the threshold value $th_{11}$ and searches out a position of the threshold value $th_{11}$ at which the error rate $e_{jk}$ exhibits a minimum value while referring to the error rate $e_{jk}$ at each position. Then, the discriminator setting block 254 determines the searched out position as the position of the threshold value $th_{11}$.

The error rate calculation unit 254a adds the weight Wi of the learning image from which a clothing feature value decided as an error is extracted based on the existence information or label of the learning image as given by the expression (7) below to calculate the error rate $e_{jk}$:

$$e_{jk} = E_w[1_{(y \neq f_{jk})}] \quad (7)$$

where $y \neq f_{jk}$ represents a condition of the pair k of clothing feature values of the error, and $E_w$ indicates that the weight of the pair k which suffers from an error is added.

At step S155, the discriminator selection block 255 selects the weak discriminator $f_{jk}$ with which the error rate $e_{jk}$ exhibits a minimum value from among the N weak discriminators $f_{jk}$ based on the N error rates $e_{jk}$ for each pair k supplied thereto from the discriminator setting block 254. Then, the discriminator selection block 255 acquires the selected weak discriminator $f_{jk}$ from the discriminator setting block 254.

At step S156, the discriminator selection block 255 calculates a reliability degree $c_j$ represented by the expression (8) given below based on the error rate $e_{jk}$ of the selected weak discriminator $f_{jk}$ and supplies a result of the calculation to the weight updating block 256.

$$c_j = \log((1-e_j)/e_j) \quad (8)$$

where $e_j$ represents the error rate $e_{jk}$ of the selected weak discriminator $f_{jk}$ from among the error rates $e_{jk}$, that is, the minimum error rate $e_{jk}$ from among the N error rates $e_{jk}$. It is to be noted that, in the following description, the weak discriminator of the selected pair k in the process at step S155 is referred to also as weak discriminator $f_j$, and the error rate $e_{jk}$ of the weak discriminator $f_j$ is referred to also as error rate $e_j$.

At step S157, the weight updating block 256 calculates the expression (9) given below based on the reliability degree $c_j$ supplied thereto to re-calculate the weight Wi for each learning image $PI_i$ and normalize and update all weights Wi, and then supplies a result of the updating to the weight setting block 252. The weight setting block 252 sets a weight for each leaning image based on the updating result of the weight supplied thereto from the weight updating block 256.

$$w_i = w_i \exp[-c_j \cdot 1_{(y \neq f_j)}], i=1,2,\ldots N \quad (9)$$

The expression (9) represents that the weight Wi of a learning image which includes a clothing feature value which suffers from an error is great.

At step S158, the discriminator selection block 255 uses the newly determined weak discriminator $f_j$ to update the clothing discriminator R(x) retained therein. In particular, the discriminator selection block 255 updates the clothing discriminator R(x) by calculating the following expression (10):

$$R(x) = R'(x) + c_j \times f_j(x) \quad (10)$$

where R'(x) is the clothing discriminator before updating retained in the discriminator selection block 255, and $f_j(x)$ is the weak discriminator $f_j$ determined newly. In particular, the discriminator selection block 255 adds the weak discriminator determined newly and weighted by multiplication by the reliability degree $c_j$ to the clothing discriminator retained therein to update the clothing discriminator.

At step S159, the discriminator selection block 255 retains the clothing feature value of the pair k of clothing feature points corresponding to the weak discriminator $f_{jk}$ with which the error rate $e_{jk}$ exhibits a minimum value as a discrimination feature value.

At step S160, the discriminator selection block 255 decides whether or not the counter j is equal to or greater than L. If it is decided at step S160 that the counter j is smaller than L, then the discriminator selection block 255 increments the counter j by 1 at step S161. Thereafter, the processing returns to step S152 to repeat the processes described above.

In particular, the weights Wi for the individual learning images set newly are used to set new weak discriminators $f_{jk}$ for the N pairs k, and the weak discriminator $f_{jk}$ with which the error rate $e_{jk}$ exhibits a minimum value is selected from among the weak discriminators $f_{jk}$. Then, the selected weak discriminator $f_{jk}$ is used to update the clothing discriminator.

On the other hand, if it is decided at step S160 that the counter j is equal to or greater than L, then the discriminator selection block 255 outputs the clothing discriminator and the discrimination feature values retained therein to the discriminator sum generation section 227 at step S162. Thereafter, the processing advances to step S115 shown in FIG. 15.

By the processes described above, a clothing discriminator formed from L weak discriminators $f_j$ ($1 \leq j \leq L$) having a comparatively low error rate is supplied to the discriminator sum generation section 227, and a clothing feature value of a pair k of clothing feature points to be used by each weak discriminator $f_j$ is supplied to the discriminator sum generation section 227. Here, L satisfies $L \leq N$.

If it to be noted that, if the clothing discriminator of the expression (10) is used to generate a discriminator or function which outputs "+1" when the clothing discriminator into which a clothing feature value is substituted is in the positive but outputs "−1" when the clothing discriminator is in the negative, then the discrimination can be regarded as a function which outputs presence/absence of an object substance to be recognized by majority voting of L weak discriminators. Further, a learning process of generating a discriminator by repeating addition of a weak discriminator while weighting the same by a learning process described hereinabove with reference to the flow chart of FIG. 16 is called Discrete Adaboost Algorithm.

In particular, by the clothing discriminator generation process described above, a process of calculating a weak discriminator and an error rate for each pair of clothing feature points so that the weight of a clothing feature value of a learning image having a high error rate gradually increases while the weight of a clothing feature value of a learning image having a low error rate gradually decreases is repeated. Accordingly, as the clothing feature value selected upon setting of a weak discriminator, that is, as the clothing feature value selected at step S152, in the repetitive processing (processes at steps S152 to S161), it gradually becomes likely to select a clothing feature value having a high error rate. Therefore, a clothing feature value which is difficult to recognize is selected repetitively as learning is repeated, and consequently, an increasing number of clothing feature values of learning images which are difficult to recognize are selected. Finally, a high recognition rate can be achieved.

Further, in the repetition processes, that is, in the processes at steps S152 to S161, the discriminator selection block 255 always selects a weak discriminator corresponding to a pair whose error rate is the lowest. Consequently, by repetitions of the learning, a weak discriminator regarding a pair of clothing feature points which exhibit the highest reliability degree is always selected and added to a clothing discriminator. Therefore, every time of repetition, a weak discriminator of higher accuracy is successively added.

Further, the clothing discriminator is a discriminator for discriminating whether or not a person as an object substance is included in an image using a clothing feature value. Then, a pair of clothing feature points corresponding to a clothing feature value to be substituted into each of weak discriminators which configure the clothing discriminator is a pair which is suitable for detection of an object substance from within an inputted image from among pairs of clothing feature points.

Figure 22:
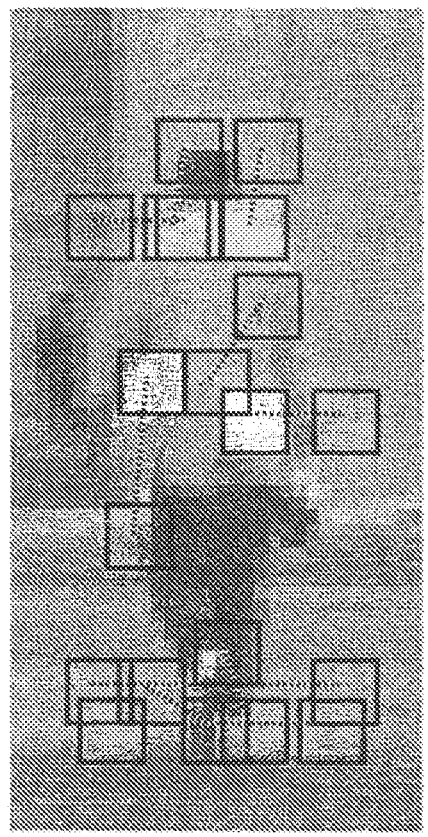
FIG. 22 is a schematic view showing a pair of clothing feature points.

For example, a pair corresponding to a clothing feature value to be substituted into a clothing discriminator is a pair of clothing feature points positioned around the person as an object substance in the image as seen in FIG. 22. In FIG. 22, a straight line of a broken line represents a straight line which interconnects two clothing feature points to be paired with each other, and quadrangles centered at the opposite ends of the broken line represent regions of the texture which are used to determine a clothing feature value.

In the example of FIG. 22, it can be seen that a pair including two clothing feature points within a range of clothes worn by a person on the image on the upper body of the person and exhibiting a small distance between the textures, that is, a low clothing feature value, another pair including a clothing feature point on the clothes of the person and another clothing feature point not on the person but on the background and exhibiting a high clothing feature value, and so forth are selected.

Referring back to FIG. 15, after the clothing discriminator generation process at step S114, the contour feature point extraction section 224 extracts contour feature points from the inputted learning image at step S115.

Figure 23A:
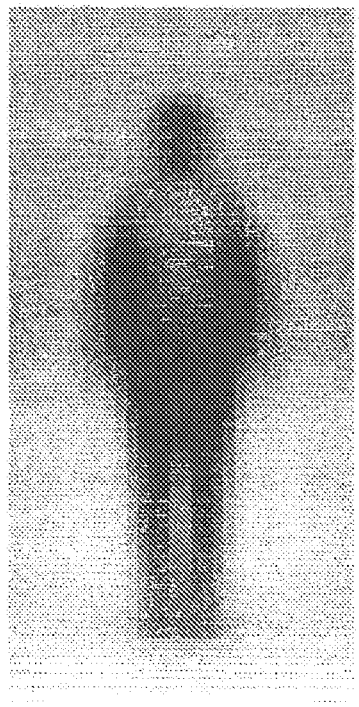
FIGS. 23A and 23B are schematic views illustrating extraction of contour feature points.
Figure 23B:
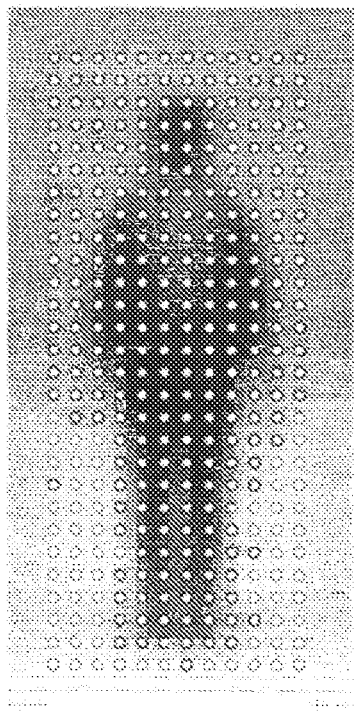

For example, if a learning image shown in FIG. 23A is inputted to the contour feature point extraction section 224, then the contour feature point extraction section 224 extracts pixels juxtaposed at predetermined intervals on the learning image as contour feature points as seen in FIG. 23B. It is to be noted that a circle on the learning image in FIG. 23B represents a pixel extracted as a contour feature point.

The learning image shown in FIGS. 23A and 23B has 32 pixels in the horizontal direction and 64 pixels in the vertical direction, and the contour feature point extraction section 224 selects every third one of the images on the learning image in the horizontal and vertical directions as pixels as contour feature points. Consequently, from the learning image, 12 pixels are selected horizontally while 28 pixels are selected vertically in FIG. 23B, and totaling 336 (=12×28) pixels are selected as contour feature points.

After the contour feature point extraction section 224 extracts contour feature points from the learning image, it supplies the extracted contour feature points and the inputted learning image to the contour feature value calculation section 225.

At step S116, the contour feature value calculation section 225 carries out a contour feature value calculation process to calculate contour feature values at the contour feature points based on the contour feature points and the learning image supplied from the contour feature point extraction section 224.

[Contour Feature Value Calculation Process]

Now, a contour feature value calculation process corresponding to the process at step S116 of FIG. 15 is described with reference to FIG. 17.

At step S201, the contour feature value calculation section 225, more particularly the first-order filter processing block 261, second-order filter processing block 262 and third-order filter processing block 263 of the contour feature value calculation section 225 shown in FIG. 12, individually select an unprocessed one of the contour feature points supplied thereto from the contour feature point extraction section 224 as a notice pixel.

At step S202, the contour feature value calculation section 225 sets a counter q indicative of a direction θq to 1. Consequently, the direction θq is set to θ1.

At step S203, the first-order filter processing block 261 carries out a primary filter process. In particular, the first-order filter processing block 261 mathematically operates the expression (2) based on the pixel value of the notice pixel of a processing object with the Gaussian width set to σ=1 and the direction of θq. Then, the first-order filter processing block 261 supplies a result of the filter process to the feature value generation block 264. In other words, the direction θ in the expression (2) is set to θq to carry out mathematical operation to extract a contour.

It is to be noted that, although the description "setting the Gaussian width to σ=1" is given above, since, in the case of the present embodiment, the Gaussian width is fixed to σ=1, or in other words, a filter having one Gaussian width is set in advance, the process of "setting the Gaussian width to σ=1" can be omitted. In other words, in the present embodiment, the process of mathematically operating the expression (2) setting the direction of a filter whose Gaussian width σ is 1 to θq is executed at step S203. Further, while the description here is continued assuming that the Gaussian width σ is σ=1, naturally the Gaussian width prepared in advance may otherwise be any other Gaussian width than σ=1.

At step S204, the second-order filter processing block 262 carries out a secondary filter process. In particular, the second-order filter processing block 262 mathematically operates the expression (3) with the direction of a filter of the Gaussian width σ=1 set to θq based on the pixel value of the notice pixel. Then, the second-order filter processing block 262 supplies a result of the filter process to the feature value generation block 264. In particular, the direction θ in the expression (3) is set to θq to carry out the mathematical operation to extract a contour.

At step S205, the third-order filter processing block 263 carries out a tertiary filter process. In particular, the third-order filter processing block 263 mathematically operates, based on the pixel value of the noticed pixel, the expression (5) with the direction of the filter of the Gaussian width σ=1 set to θq, and supplies a result of the filter process to the feature value generation block 264. In particular, the direction θ in the expression (5) is set to θq to carry out mathematical operation to extract a contour.

At step S206, the contour feature value calculation section 225 decides whether or not the direction θq is θ4, that is, whether or not the counter q is q=4. If it is decided at step S206 that the direction θq is not θ4, then the contour feature value calculation section 225 increments the counter q by 1 at step S207. For example, if the counter q is q=1, then the counter q is incremented by 1 so that it becomes q=2, and consequently, the direction θq becomes θ2. After the counter q is incremented, the processing returns to step S203 to repeat the processes described above.

On the other hand, if it is decided at step S206 that the direction θq is θ4, then the feature value generation block 264 synthesizes, at step S208, the mathematical operation results supplied thereto from the first-order filter processing block 261, second-order filter processing block 262 and third-order filter processing block 263 as a contour feature value thereby to generate a contour feature value for the one contour feature point.

The contour feature value is determined by the following expression (11) or (12):

$$v_j = \sum_{x,y} |G_{d,\theta} \otimes I(x_i, y_i, s_i,)| \qquad (11)$$

$$v_j = \max_{x,y} |G_{d,\theta} \otimes I(x_i, y_i, s_i,)| \qquad (12)$$

wherein $G_{d,\theta}$ is a dth-order derivation function of the Gaussian function G at an arbitrary angle θ similarly as in the expression (2) and the other expressions. Further, $(x_i, y_i)$ of $I(x_i, y_i, s_i)$ represents a coordinate of the contour feature point of a processing object in the image, and $(s_i)$ represents a scale of the image of the processing object from among the images which configure the pyramid images.

The expression (11) represents carrying out convolution mathematical operation of the dth-order derivation function of the Gaussian function G and the contour feature value at the arbitrary angle θ and mathematical operation of the sum total of the absolute value of the resulting value by Σ. The expression (12) represents carrying out convolution mathematical operation of the dth-order derivation function of the Gaussian function G and the contour feature value at the arbitrary angle θ and taking a maximum value of the absolute values by max.

While both of the expressions (11) and (12) calculate a feature value, the expression (11) is for calculating local energy while the expression (12) is for calculating a local maximum value. The significance of the expression is described more particularly.

By such a process as described above, it is possible to carry out supervised statistical learning using a filter coefficient extracted by a function and a scale at an arbitrary angle as a feature value and generate a detection discriminator for detecting an object substance such as a person. However, with this detection discriminator, the feature value becomes, for example, a feature value which relies upon a relationship between the clothing which the person wears and the background. Further, as regards an authentication object having great distortion or deformation as in the case of a person, the selectivity of a feature value is excessively high. Therefore, it is important to carry out processing with those matters absorbed so that individual feature values may become feature values having invariance.

To make "a feature value which relies upon a relationship between the clothing which the person wears and the background" a feature value having invariance can be solved by mathematically operating an absolute value of an output value after the filter process. By mathematically operating absolute values, feature values proximate to a contour of a person can be extracted. Further, in the present embodiment, a primary deviation function, a secondary derivation function and a tertiary derivation function are mathematically operated, and mathematical operation of absolute values is carried out. Therefore, in comparison with an alternative case wherein mathematical operation is carried out only with absolute values by a primary deviation function, the accuracy can be improved remarkably and feature values having invariance can be calculated.

Further, regarding that, "as regards an authentication object having great distortion or deformation as in the case of a person, the selectivity of a feature value is excessively high," by carrying out invariant mathematical operation by positional displacement, a feature value absorbing this can be mathematically operated. The invariant mathematical operation by positional displacement is, for example, mathematical operation which utilizes the fact that, when a contour of the face of a person is detected, the length of the contour is substantially same irrespective of the shape of the face. In other words, the invariant mathematical operation is operation by which, when attention is paid to a predetermined portion of the contour, even if the portion is displaced in position, it is regarded that, for example, when the contour of a person of a substantially round face moves positionally and comes to overlap with a contour of a person of an elongated face, although the position is displaced, the values of the length and so forth are invariable.

As such mathematical operation, the sum total is arithmetically operated as given by the expression (11). By mathematically operating the sum total, for example, the sum total of the contour of the face of a person is mathematically operated. Alternatively, a maximum value is mathematically operated as given by the expression (12). By mathematically operating a maximum value, for example, a maximum value of the contour of the face of a person is mathematically operated.

Here, two mathematical operations of the sum total and the maximum value are described above. In other words, either mathematical operation of calculating local energy based on the expression (11) or mathematical operation of a local maximum value based on the expression (12) is described. In addition, mathematical operation of calculating local energy in the proximity of a point which exhibits a local maximum value may be calculated. This is similar to that mathematical operation of the expression (11) is carried out based on a result of mathematical operation of the expression (12). Alternatively, mathematical operation of calculating a maximum value around local energy may be carried out. This is similar to that mathematical operation of the expression (12) is carried out based on a result of the mathematical operation of the expression (11). Although a particular expression is not presented, such mathematical operation may be carried out to calculate a feature value.

By such mathematical operation, feature points are calculated from the contour feature points. Then at step S209, the contour feature value calculation section 225 decides whether or not the processing is ended with regard to all contour feature points. For example, if a contour feature value is determined with regard to all contour feature values supplied thereto from the contour feature point extraction section 224, then it is decided that the processing is ended.

If it is decided at step S209 that the processing is not ended with regard to all contour feature points, then the processing returns to step S201, at which a next contour feature point is selected as a noticed pixel.

On the other hand, if it is decided at step S209 that the processing is ended with regard to all contour feature points, then the feature value generation block 264 supplies the learning image supplied from the contour feature point extraction section 224 and the generated contour feature values of the contour feature points to the contour discriminator generation section 226. Thereafter, the processing advances to step S117 of FIG. 15.

It is to be noted that, for detection of a contour feature value from a learning image, not a steerable filter but a Gabor filter or the like may be used.

Referring back to FIG. 15, after the contour feature values of the contour feature points are determined at step S116, the contour discriminator generation section 226 carries out, at step S117, a contour discriminator generation process based on the learning image and the contour feature values supplied thereto from the contour feature value calculation section 225 to generate a contour discriminator. It is to be noted that, since this contour discriminator generation process is similar to the clothing discriminator generation process described hereinabove with reference to FIG. 16, overlapping description of the same is omitted herein to avoid redundancy.

In particular, the clothing discriminator generation process and the contour discriminator generation process are different from each other only in whether the feature value of a processing object is a clothing feature value or a contour feature value. Accordingly, in the contour discriminator generation process, a contour discriminator is generated from a sum of weak discriminators corresponding to a contour feature value of a contour feature point of the lowest error rate. The contour discriminator generation section 226 outputs the contour discriminators and the discrimination feature values generated thereby to the discriminator sum generation section 227.

At step S118, the discriminator sum generation section 227 integrates the clothing discriminators supplied thereto from the clothing discriminator generation section 223 and the contour discriminators supplied from the contour discriminator generation section 226 with each other to generate a discriminator sum.

For example, since a discriminator obtained by a statistic learning process by Adaboost is represented by linear coupling of weak discriminators, the discriminator sum generation section 227 integrates the clothing discriminators and the contour discriminators by the Late Fusion method.

In particular, the discriminator sum generation section 227 calculates the expression (13) to determine a discriminator sum U(x) of the clothing discriminator R(x) and a contour discriminator T(x). In particular, the discriminator sum U(x) is determined by linear coupling of the clothing discriminator R(x) and the contour discriminator T(x).

$$U(x)=\alpha \cdot R(x)+\beta \cdot T(x) \quad (13)$$

where $\alpha$ and $\beta$ are predetermined constants, that is, tuning parameters and are determined by discrimination rates regarding a learning image, for example, used in the statistic learning process. Further, the contour discriminator T(x) is the sum of weak discriminators multiplied by a reliability degree similarly to the clothing discriminator R(x) indicated by the expression (10).

After the discriminator sum is generated in this manner, the discriminator sum generation section 227 supplies the generated discriminator sum to the discriminator sum recording section 236 so as to be recorded. Further, the discriminator sum generation section 227 adds the discrimination feature value supplied from the contour discriminator generation section 226 to the discrimination feature value supplied from the clothing discriminator generation section 223 to generate a final discrimination feature value. Then, the discriminator sum generation section 227 supplies the final discrimination feature value to the discriminator sum recording section 236 so as to be recorded, thereby ending the learning process.

This learning process is carried out for each posture or gesture to be decided, and a plurality of discriminator sums for deciding a posture are stored into the discriminator sum recording section 236.

In this manner, the learning apparatus 211 detects clothing feature points from a learning image to determine clothing feature values of pairs of the clothing feature points and generates clothing discriminators by statistic learning. Then, the learning apparatus 211 extracts contour feature points from the learning image to determine contour feature values and generates contour discriminators by statistic learning. Then, the learning apparatus 211 integrates the clothing discriminators and the contour discriminators by linear coupling to generate a discriminator sum.

By generating the discriminator sum by integrating the clothing discriminators and the contour discriminators in this manner, a discriminator sum with which an object substance can be detected with certainty from an image can be provided. In particular, since the discriminator sum is obtained by integration of clothing discriminators which utilize a feature of the clothing of the object substance and contour discriminators which utilize a contour of the object substance, if at least one of the feature values can be extracted sufficiently from an inputted image, then an object substance can be detected from the image.

In the case where a person as an object substance is detected from an image, the person as an object substance should be detected as a person even if the clothing of the person varies. Therefore, in the past, only a contour was used as the feature value, which does not depend upon the luminance of the clothing of a person, to carry out detection of a person from within the image.

In contrast, the learning apparatus 211 uses a clothing feature value, which utilizes a feature of the clothing of a person and is invariable irrespective of a variation of a pattern of the clothing of a person, for detection of a person from within an image. This clothing feature value is a feature value defined newly taking notice of the fact that the frequency is statistically high in which a person wears clothes which have, on the upper body of the person, a pattern of repetitions of the same texture and have, on the lower body (trousers) of the person, a pattern of repetitions of the same texture.

In particular, the clothing feature value indicates a degree at which the patterns in texture, that is, in luminance, in two arbitrary regions on an image are similar to each other. For example, the similarity in texture between two regions of the upper body of a person is high, but the similarity in texture between the upper body, lower body or clothing of a person and the background is low. The learning apparatus 211 uses a clothing discriminator for detecting a person from an image utilizing such similarity in texture between two regions to generate a discriminator sum.

Accordingly, for example, even if a contour cannot be detected sufficiently from within an inputted image, if a similar feature in texture between two regions can be extracted from within an image, then a person can be detected from within the image using the discriminator sum. On the contrary, if clothes which a person wears have a pattern not of repetitions but are partly hidden by a bag or the like, then there is the possibility that a similar feature in texture may not be able to be extracted sufficiently from the image. However, if a contour can be detected sufficiently from within the image, then the person can be detected from within the image using the discriminator sum.

[Configuration of the Recognition Apparatus]

FIG. 24 shows a configuration of the recognition apparatus 212. Each of the recognizers 152-1 to 152-N shown in FIG. 9 is configured particularly from a recognition apparatus 212 shown in FIG. 24. Referring to FIG. 24, the recognition apparatus 212 uses a plurality of discrimination feature values and discriminator sums recorded in the discriminator sum recording section 236 to discriminate whether or not an image of a predetermined posture of a person which is an object body exists in the input image inputted thereto. Then, the recognition apparatus 212 outputs a result of the recognition.

The recognition apparatus 212 includes a pyramid image generation section 230, a clothing feature point extraction section 231, a clothing feature value calculation section 232, a contour feature point extraction section 233, a contour feature value calculation section 234, a discrimination calculation section 235, and a discriminator sum recording section 236. The pyramid image generation section 230, clothing feature point extraction section 231, clothing feature value calculation section 232, contour feature point extraction section 233 and contour feature value calculation section 234 of the recognition apparatus 212 carry out processes similar to those carried out by the pyramid image generation section 220, clothing feature point extraction section 221, clothing feature value calculation section 222, contour feature point extraction section 224 and contour feature value calculation section 225 of the learning apparatus 211, respectively, for an input image from within which an object substance is to be recognized. Accordingly, detailed description of them is omitted herein to avoid redundancy.

The discrimination calculation section 235 reads out predetermined ones of a plurality of discrimination feature values and a discriminator sum recorded in the discriminator sum recording section 236. Further, the discrimination calculation section 235 substitutes those of the clothing feature values from the clothing feature value calculation section 232 and the contour feature values from the contour feature value calculation section 234 which correspond to the discrimination feature values into the read out discriminator sum to carry out mathematical operation.

[Recognition Process]

Now, a process when the recognition apparatus 212 detects or recognizes an object substance such as, for example, a person is described with reference to FIG. 25. If an input image is inputted from the noticed region setting block 32 shown in FIG. 1 to the recognition apparatus 212, then the recognition apparatus 212 starts a person detection process to detect a posture of an object substance from the input image.

Figure 25:
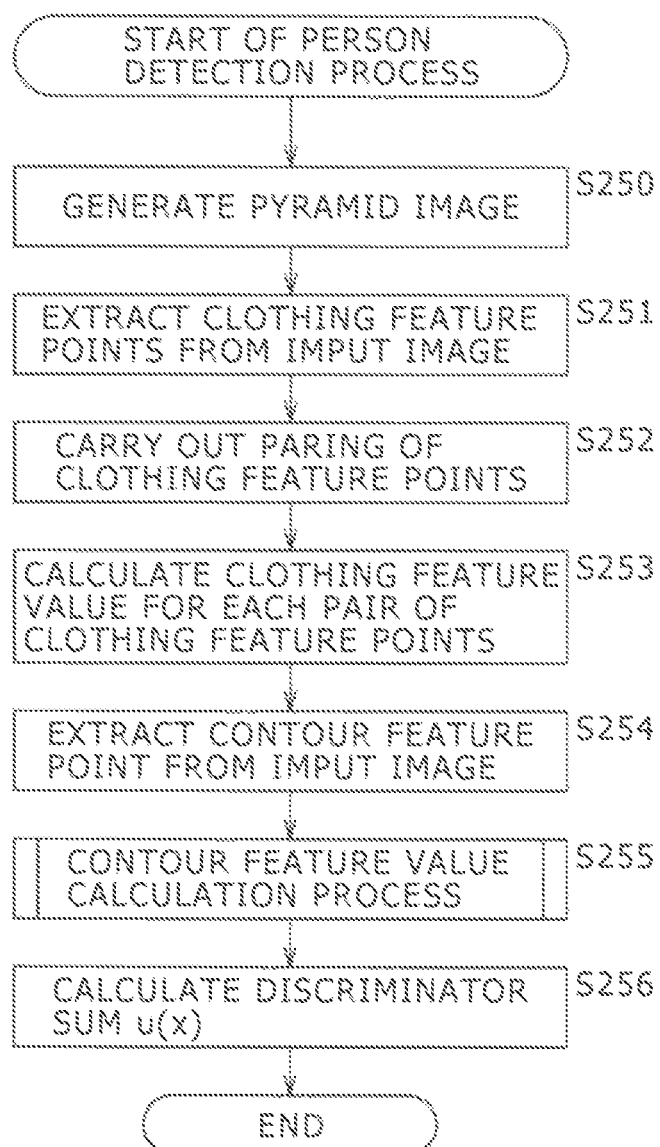
FIG. 25 is a flow chart illustrating a person detection process.

It is to be noted that processes at steps S250 to S253 of FIG. 25 are similar to those at steps S110 to S113 of FIG. 15, respectively.

In particular, at step S250, the pyramid image generation section 230 generates pyramid images from the inputted image. It is to be noted that, when the pyramid image generation section 230 generates pyramid images, it generates images of the same scales or resolutions as those of the pyramid images generated by the pyramid image generation section 220 of the learning apparatus 211. By adjusting the scale coefficients upon learning to the scale coefficients upon recognition in this manner, scanning of a high frequency can be carried out upon recognition.

At step S251, the clothing feature point extraction section 231 extracts clothing feature points from the learning image supplied thereto and supplies the extracted clothing feature points and the learning image to the clothing feature value calculation section 232.

At step S252, the clothing feature value calculation section 232 carries out, based on the clothing feature points and the input image supplied thereto from the clothing feature point extraction section 231, pairing of the clothing feature points with regard to each of the clothing feature points.

At step S253, the clothing feature value calculation section 232 calculates a clothing feature value for each pair of clothing feature points paired with each other by the pairing and supplies resulting clothing feature values to the discrimination calculation section 235.

At step S254, the contour feature point extraction section 233 carries out a process similar to that at step S115 of FIG. 15 to extract contour feature points from the input image inputted thereto and supplies the extracted contour feature points to the contour feature value calculation section 234 together with the input image.

At step S255, the contour feature value calculation section 234 carries out a contour feature value calculation process based on the input image and the contour feature points from the contour feature point extraction section 233 to calculate a contour feature value of each contour feature point. Then, the contour feature value calculation section 234 supplies the determined contour feature values to the discrimination calculation section 235. It is to be noted that this contour feature value calculation process is similar to the contour feature value calculation process described hereinabove with reference to FIG. 17, and therefore, overlapping description of the same is omitted herein to avoid redundancy.

At step S256, the discrimination calculation section 235 reads out the discrimination feature values and the discriminator sum from the discriminator sum recording section 236 and substitutes the feature values into the read out discriminator sum to carry out calculation. In particular, the discrimination calculation section 235 substitutes those of the clothing feature values from the clothing feature value calculation section 232 and the contour feature values from the contour feature value calculation section 234 which correspond to the notification feature values into the discriminator sum $U(x)$ of the expression (13) to calculate the value of the discriminator sum $U(x)$.

Here, the feature values substituted into the weak discriminators which configure the discriminator sum are those determined from the pairs of the clothing feature points or the contour feature points on the input image, which are positioned at the same positions as those of the pairs of the clothing feature points or the contour feature points of the learning image from which the feature values determined as the discrimination feature values are determined. Further, the feature values determined as the discrimination feature values are those used for setting of the weak discriminators which configure the discriminator sum upon statistic learning processing.

From among the mathematical operation results of the discriminator sum $U(x)$ for the individual recognizers 152 calculated in this manner, the values in the restriction regions are removed by the restriction section 154 shown in FIG. 9. Then, the maximum value output recognizer 155 selects a recognizer 152 corresponding to a maximum mathematical operation result of the discriminator sum $U(x)$ thereby to select a posture allocated to the recognizer 152. Consequently, a posture, that is, a gesture, of the user is detected.

While, in the foregoing description, an example wherein a statistic learning process is executed based on the Discrete Adaboost Algorithm, a different Boosting Algorithm may be applied, and, for example, the Gentle Adaboost Algorithm may be used. The Discrete Adaboost Algorithm and the Gentle Adaboost Algorithm are different from each other in that, while an output result of the discriminator of the former is a discrete variable, an output result of the discriminator of the latter is a continuous variable. However, since, in the former, a reliability degree is multiplied, the output result is handled as a substantially continuous variable, and there is no substantial difference in processing.

Further, the SVM (Support Vector Machine) or the Baysian may be used to carry out a statistic learning process to generate a clothing discriminator or a contour discriminator. It is to be noted that, if a feature value such as a clothing feature value or a contour feature value is selected by the Adaboost or the like in a statistic learning process, then processing can be carried out at a higher speed upon detection of a person using a discriminator sum by the feature value mathematical operation block 41.

Further, while, in the foregoing description, it is described that clothing discriminators and contour discriminators are generated and integrated to generate a discriminator sum, the discriminator sum may otherwise be generated directly from clothing feature values and contour feature values without generating clothing discriminators and contour discriminators.

By using an inputted image to form images of different resolutions, that is, pyramid images, and carrying out a filter process for the images of the different resolutions as described above, it is possible to improve the calculation efficiency and improve the processing speed. Therefore, it becomes possible, for example, to recognize an object substance such as a person on the real time basis.

For example, if a process using a plurality of filters is carried out for a plurality of images of different scales, then much filter mathematical operation is required, resulting in the possibility that the processing time or the processing capacity may increase. However, if a process using a single filter is carried out for a plurality of images of different scales as in the present embodiment, then since only one scale is required for convolution, the process can be carried out without much mathematical operation. Consequently, the processing speed can be improved.

Further, in the case of a multi scale filter, if the frequency becomes low, that is, if the Gaussian width a becomes great, then time required for convolution mathematical operation becomes long. However, according to the present embodiment, it is possible to configure a filter with a single Gaussian width, and there is no necessity to prepare a plurality of filters of different Gaussian widths and there is no necessity to carry out mathematical operation by a plurality of filters of different Gaussian widths. Therefore, according to the present embodiment, even if a single filter for the highest frequency is prepared to carry out processing, the processing speed can be improved significantly in comparison with that in the case of a multi scale filter.

[Principle of the Discriminator]

Figure 26:
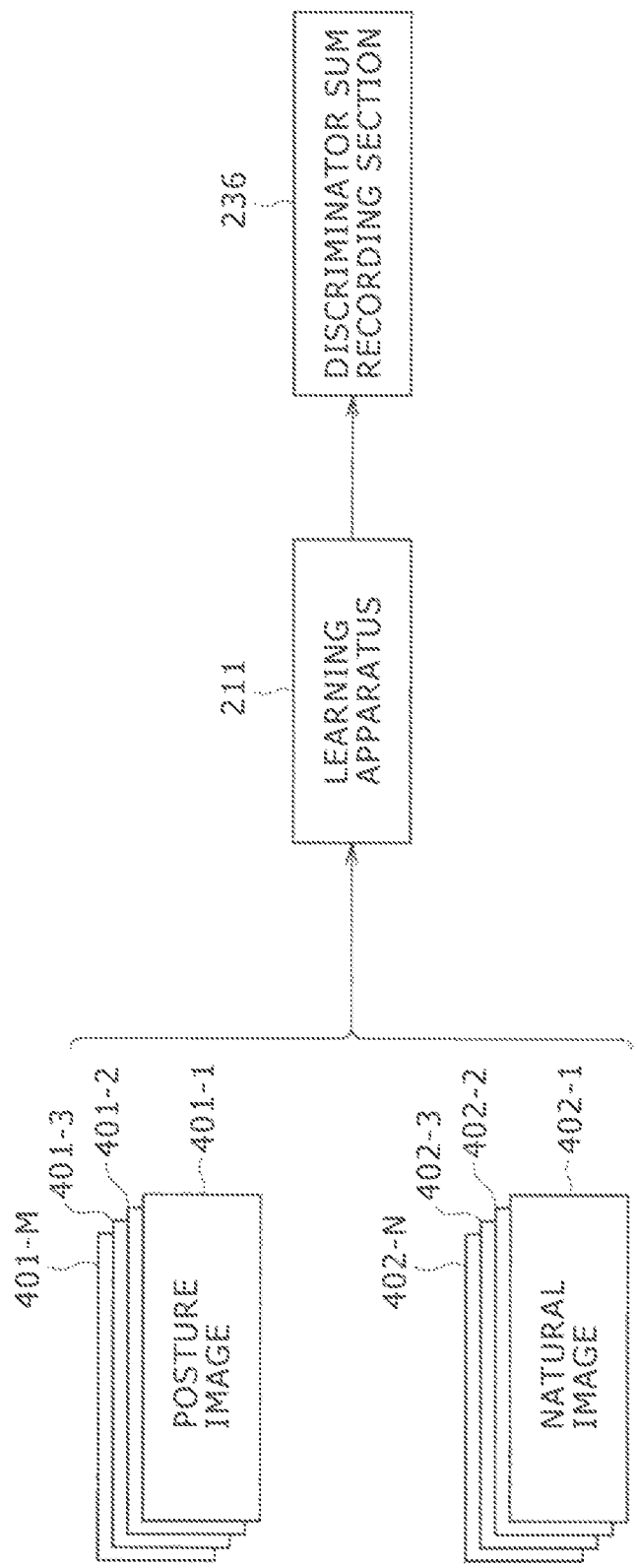
FIG. 26 is a block diagram illustrating a principle of generation of a discriminator.

The process for generating a recognizer 152 can be summarized in the following manner. FIG. 26 illustrates a principle of generation of a discriminator 152.

In the embodiment described above, a person is detected as an object substance. In order to detect a person, upon learning by the learning apparatus 211, an image in which a person of a predetermined posture is imaged and a different image are used to carry out learning. If the learning apparatus 211 uses posture images 401-1 to 401-M and natural images 402-1 to 402-N, which are not posture images, to carry out learning as seen in FIG. 26, then a discriminator sum with which a detection object of a predetermined posture can be discriminated or detected can be generated.

In the case where a discriminator sum for discriminating a gesture when the channel of a television receiver is changed over is to be generated, M posture images 401 which include an image of the gesture are used to carry out learning. An image which is to be inputted as a natural image to the learning apparatus 211 is an image which does not include the gesture. N such natural images are used to carry out learning.

M+N posture images 401 and natural images 402 are inputted to the learning apparatus 211 and learned to generate a discriminator sum for discriminating a predetermined gesture, which is recorded into the discriminator sum recording section 236. The discriminator sum can be used to discriminate whether or not an inputted image is an image of the predetermined gesture. Further, in the case where images of a gesture, for example, when the power supply is turned off are used as the posture images 401 to carry out learning, a discriminator sum for discriminating the gesture when the power supply is turned off is generated.

In other words, a discriminator sum suitable for a gesture to be discriminated can be generated based on a gesture of the posture images 401 used for learning.

With the discriminator sum generated in this manner for discriminating a predetermined posture, the posture can be discriminated with a high degree of accuracy. Further, since the calculation efficiency of calculation carried out for the discrimination is high, the processing speed can be improved.

Second Embodiment

Figure 27:
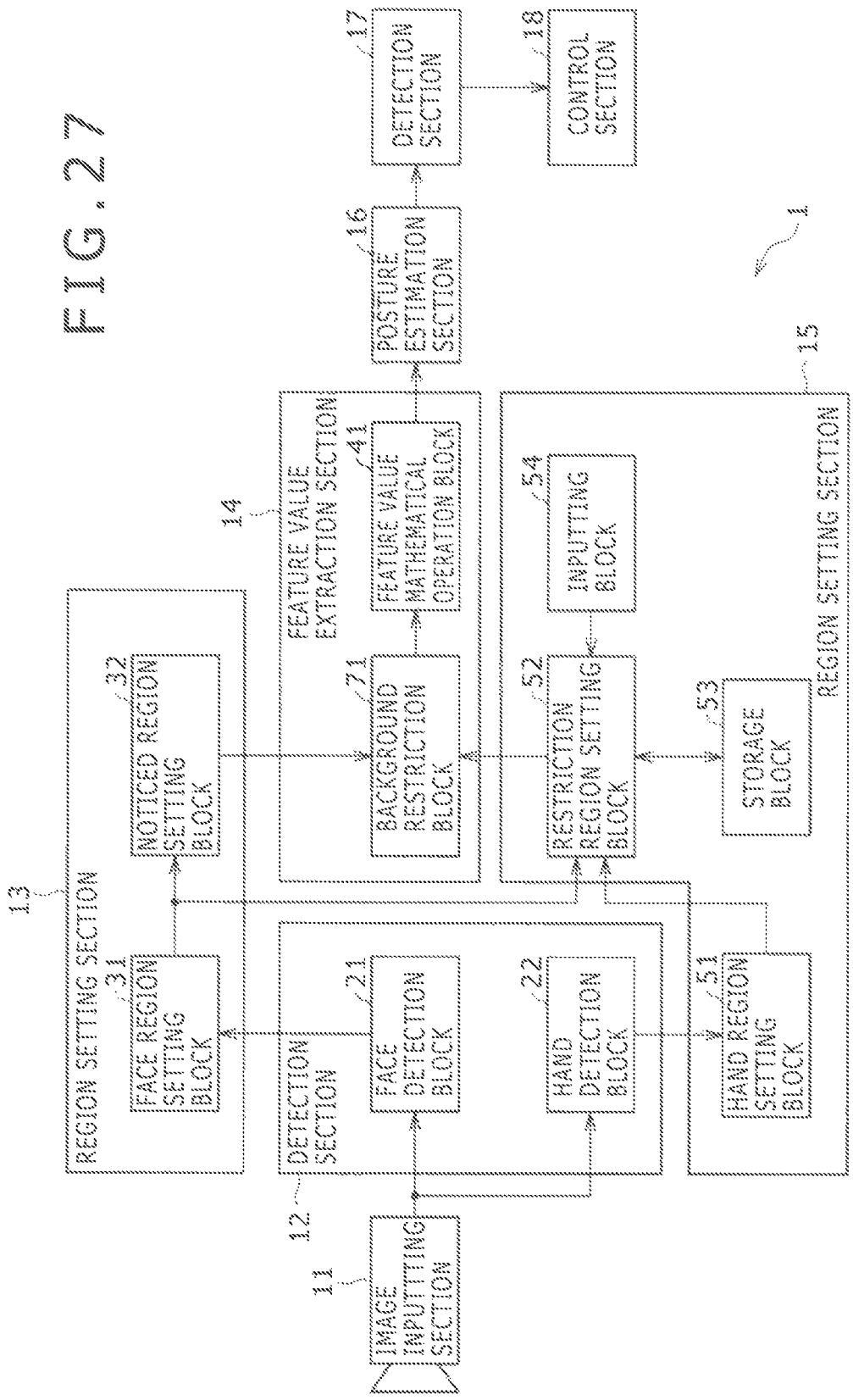
FIG. 27 is a block diagram showing a configuration of an information processing apparatus according to another embodiment of the present disclosure.

FIG. 27 shows a configuration of an information processing apparatus according another embodiment. In the present embodiment, the information processing apparatus is configured basically similarly to that of the first embodiment. The information processing apparatus of the present embodiment is different from that of the first embodiment only in that the feature value extraction section 14 includes a background restriction block 71 and a feature value mathematical operation block 41.

Referring to FIG. 27, the background restriction block 71 carries out a process of excluding a background region from a noticed region. In particular, the background restriction block 71 excludes the restriction regions 131 to 134 set by the restriction region setting block 52 from the noticed region 112 set by the noticed region setting block 32 to extract the region 141. The feature value mathematical operation block 41 mathematically operates feature values with regard to the region 141 extracted by the background restriction block 71 and outputs the feature values to the posture estimation section 16. Except the operations, the feature value extraction section 14 operates similarly as in the first embodiment.

The mathematical operation of feature values with regard not to the entire noticed region 111 but to the region 141 which does not include the restriction regions 131 to 134 of the noticed region 111 reduces the mathematical operation amount.

<Modification>

While, in the foregoing description, the face and the hands are utilized as portions of the human body, also it is possible to utilize some other portions of the human body.

<Application to a Program>

The series of processes described above may be executed by hardware or by software.

In the case where the series of processes is executed by software, a program which constructs the software is installed from a network or a recording medium into a computer incorporated in hardware for exclusive use or, for example, a personal computer for universal use which can execute various functions by installing various programs.

<Others>

It is to be noted that, in the present specification, the steps which describe the program recorded in a recording medium may be but need not necessarily be processed in a time series in the order as described, and include processes which are executed in parallel or individually without being processed in a time series.

While preferred embodiments have been described using specific terms, such description is for illustrative purpose only, and it is to be understood that changes and variations may be made without departing from the spirit or scope of the following claims.

The present disclosure contains subject matter related to that disclosed in Japanese Priority Patent Application JP 2010-194821 filed in the Japan Patent Office on Aug. 31, 2010, the entire content of which is hereby incorporated by reference.

What is claimed is:

1. An information processing apparatus, comprising:
   circuitry configured to
   receive an image;
   detect at least a portion of a person from within the image;
   a set a face of the person as a noticed region from the detected portion;
   set one or both of the face of the person and a hand or hands of the person as a restriction region from the detected portion;
   exclude the restriction region from the noticed region;
   extract feature values of the noticed region restricted by the restriction region; and
   perform a predetermined mathematical operation on the feature values of the noticed region from which the restriction region is excluded.

2. The information processing apparatus according to claim 1, wherein the portion to which the restriction region is set includes a portion different from the portion to which the noticed region is set.

3. The information processing apparatus according to claim 1, wherein the circuitry is configured to:
   estimate a posture of the person from the feature values of the noticed region restricted by the restriction region.

4. The information processing apparatus according to claim 3, wherein the circuitry is configured to:
   detect a command from the estimated posture of the person.

5. The information processing apparatus according to claim 4, wherein the circuitry is configured to:
   control operation in response to the detected command.

6. An information processing method, comprising:
   receive an image;
   detecting at least a portion of a person from within the image;
   setting a face of the person as noticed region from the detected portion;
   setting one or both of the face of the person and a hand or hands of the person as a restriction region from the detected portion;
   excluding the restriction region from the noticed region;
   extracting feature values of the noticed region restricted by the restriction region; and
   performing a predetermined mathematical operation on the feature values of the noticed region from which the restriction region is excluded.

7. A non-transitory computer-readable medium including a program for causing a computer to:
   receive an image;
   detect at least a portion of a person from within the image;
   set face of the person as a noticed region from the detected portion;
   set one or both of the face of the person and a hand or hands of the person as a restriction region from the detected portion;
   exclude the restriction region from the noticed region;
   extract feature values of the noticed region restricted by the restriction region; and
   perform a predetermined mathematical operation on the feature values of the noticed region from which the restriction region is excluded.

* * * * *